United States Patent [19]
Wang

[11] 3,868,589
[45] Feb. 25, 1975

[54] THIN FILM DEVICES AND LASERS
[75] Inventor: Shyh Wang, El Cerrito, Calif.
[73] Assignee: The Regents of the University of California, Berkeley, Calif.
[22] Filed: Feb. 12, 1973
[21] Appl. No.: 331,675

Related U.S. Application Data
[63] Continuation-in-part of Ser. No. 296,178, Oct. 10, 1972, abandoned.

[52] U.S. Cl............ 331/94.5, 330/4.3, 350/96 WG
[51] Int. Cl.............................................. H01s 3/02
[58] Field of Search.................. 331/94.5; 330/4.3; 350/96 WG

[56] References Cited
OTHER PUBLICATIONS
Kogelnik et al., Stimulated Emission in a Periodic Structure., Appl. Phys. Lett., Vol. 18, No. 4 (Feb. 15, 1971) pp.152–154.
Shank et al., Tunable Distributed-Feedback Dye Laser. Appl. Phys. Lett., vol. 18, No. 9 (May 1, 1971) pp.395–396.
Marcuse, Hollow Dielectric Waveguide for Distributed Feedback Lasers. IEEE J. Quant. Elect., Vol. QE-8, No. 7 (July 1972) pp. 661–669.

Primary Examiner—William L. Sikes
Attorney, Agent, or Firm—Flehr, Hohback, Test, Albritton & Herbert

[57] ABSTRACT

Here new periodic structures are proposed for making thin film optical devices such as lasers and passive devices such as filters and modulators utilizing the thickness variation introduced in a multi-layer thin film optical waveguide. Wave propagation in such structures is analyzed. Expressions are derived for the amount of distributed feedback and possible scattering loses. From the coupled-wave equations, the laser-oscillation conditions are developed. Examples of the invention are given for making distributed feedback lasers in several configurations and with semi-conductor, dye and solid-state materials.

30 Claims, 20 Drawing Figures

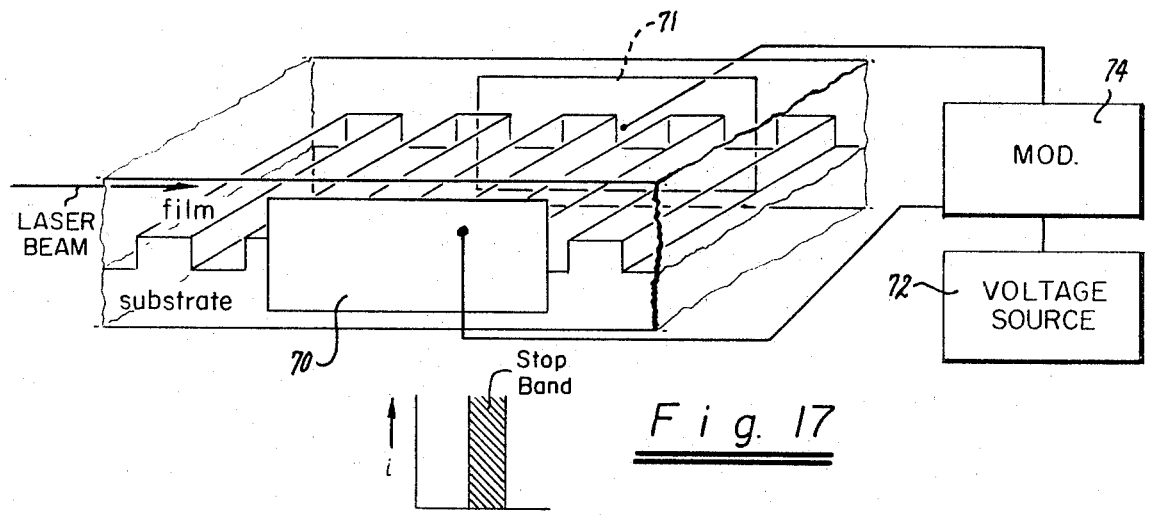
Fig. 17
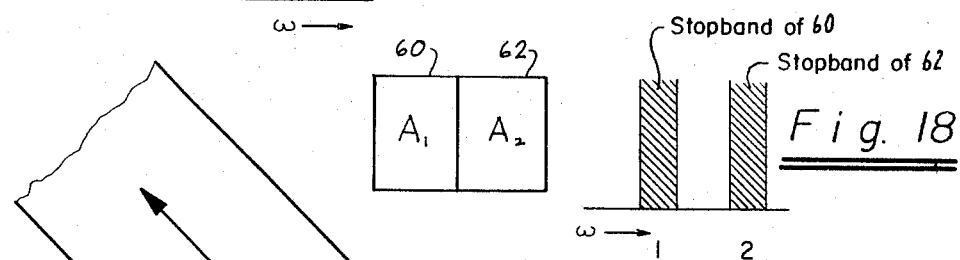
Fig. 18
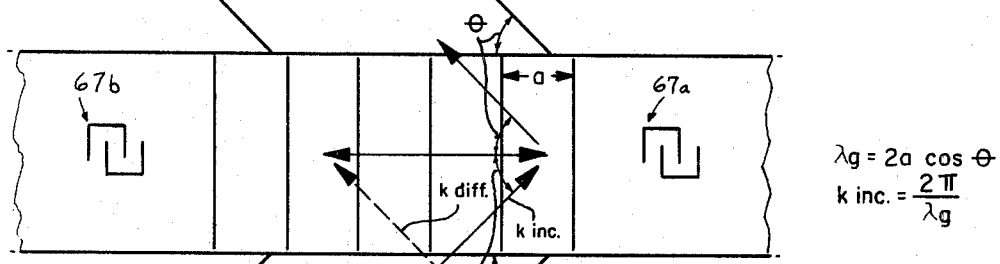
$\lambda g = 2a \cos \theta$
$k \text{ inc.} = \dfrac{2\pi}{\lambda g}$
Fig. 19
Fig. 20
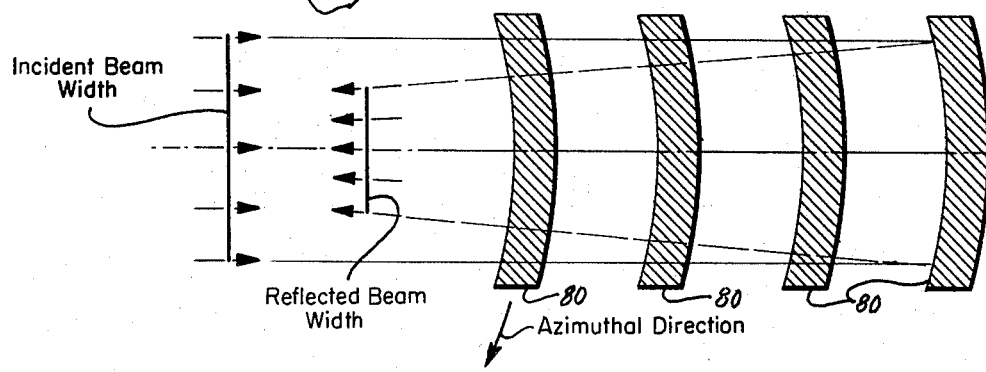

3,868,589

THIN FILM DEVICES AND LASERS

This application is a continuation-in-part of my copending application, Ser. No. 296,178 filed Oct. 10, 1972 and now abandoned, entitled Thin Film Lasers.

The invention herein described was made in the course of a grant from the Air Force Office of Scientific Research.

BACKGROUND OF THE INVENTION

This invention relates to thin film optical devices and lasers.

Recent developments suggests considerable usefulness for optical systems in which light beams carrying information are guided along paths defined by thin films. Such paths are producible by known integrated circuit technology and have become known as integrated optics. The production technique is essentially one of forming thin film optical transmission paths which may be used for light signal transmission. The concept developed for integrated circuits by assembling separate electronic components together in forming an integrated electronic system on a common substrate material has made possible the rapid development of complex electronic systems such as those used for communications and in computers. This concept is capable of being duplicated at least in principle by an optical equivalent. It is with relation to such optical systems that the present invention finds application.

Laser beams are particularly interesting in their ability to be guided, modified or otherwise handled in technologically useful ways in such integratd optical systems. However, lasers themselves have not been available which lend themselves to such applications. In fact, most work to date has centered on means to cause a laser beam produced by apparatus many times larger than the scale of integrated optics technology to be coupled into such integrated optical circuits. Accordingly, transferring optical apparatus have had to be developed to couple the laser beam output into such thin film optical channels. Such large scale lasers and the associated coupling optics are expensive, inconvenient to use and do not lend themselves to an otherwise fully integrated optical system. An integrated optical system has many advantages over the conventional (large-scale) laser system, namely, possibility of uninterrupted signal transmission, mechanical stability and compactness of the system, and compatibility with the integrated circuit technology.

Recently, laser action in thin films of an active medium have been achieved [1, 2] by using periodic variations of the refractive index within the medium and/or the gain of a thin film laser medium serving also as a wave guide which thereby serves to provide the necessary feedback for amplification or oscillation within the film. In general, this has been accomplished by first impregnating the laser-active material such as organic dye in a polymeric substance and then exposing the combined system to coherent light, typically an argon laser, the applicability of the index-variation method is limited to laser materials soluble in polymeric substances of the prior art. However, the method does not lend itself to operation with semiconductor and solid-state lasers since the change of index of refraction in semiconductors and solid-state materials after exposure to light is either not permanent or not significant for thin-film lasers. In cases where the gain-variation method of the prior art is used, a coherent light source is needed as the pump. Further more, the ability of the method is unduly limited by the necessity of maintaining a precise control of the paths of the coherent pump source, there the requirements imposed on the use of the gain-variation method of the prior art are not fully compatible with the integratedoptic concept. There is therefore a need for a new and improved thin film laser. In addition, there is a need for new and improved thin film optical devices such as filters and modulators.

In the general context of this application, laser is the well-known acronym for light amplification by stimulated emission of radiation within a medium; and, in the sense used herein comprehends amplification itself without the necessity of sustained oscillations. As is also known, when the gain exceeds a predetermined threshold, oscillation results creating the well-known laser beam. In a context of the present description, laser is used in the broadest sense, including both amplification and amplification exceeding the gain threshold at which oscillation occurs and a laser output results. Optical device in the present context including passive devices such as filters and modulators which can be constructed from the structures disclosed herein.

SUMMARY OF THE INVENTION AND OBJECTS

In general, it is an object of the present invention to privide thin film optical devices and lasers which will overcome the above limitations and disadvantages.

It is a further general object to provide an integrated optical laser in which light amplification occurs within a media of the integrated optical type or within a thin film optical waveguide at least capable of direct coupling within an integrated system.

Another object of the invention is to provide an integrated optical laser which utilizes a material embodied in an integrated optical circuit which material is modified by structural properties in adjacent layers to provide sufficient feedback to obtain laser action.

Another object is to provide a thin film passive devices, such as filters and modulators, constructed in accordance with the present invention.

DESCRIPTION OF FIGS. 1-11

In the following theoretical description certain of the Figures and drawings herein will be used to illustrate both the structures proposed and the accompanying analysis. In that connection the following is a brief description of the Figures utilized in connection with this theoretical description, the description of the remainder of the Figures being given hereinafter.

Figure 5:
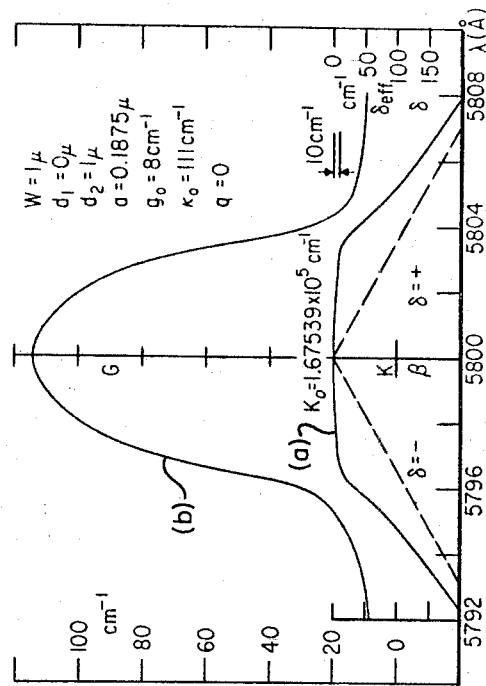

FIG. 5 is a graph illustrating the dispersion $\omega$ versus K diagram for a periodic waveguide. At $\omega = \omega_0$, the Bragg condition $\beta(\omega_0) = m\pi/a$ is satisfied. In a waveguide of a certain thickness, there exists a cut-off frequency $\omega_c$ below which a given transverse mode can no longer be supported by the waveguide.

Figure 6:
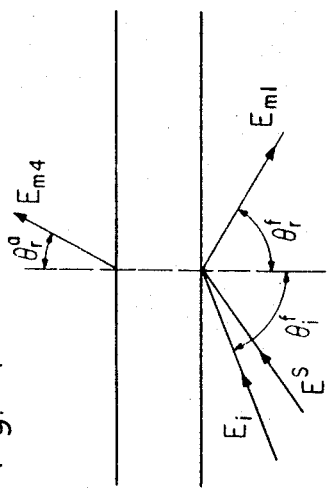

FIG. 6(a and b) are diagrams showing (a) the dispersion and (b) the gain curves ($K$ versus $\omega$ and $G$ versus $\omega$ curves) in a periodic waveguide as compared to the corresponding curves ($\beta$ versus $\omega$ and $g$ versus $\omega$ curves) in a uniform waveguide. The diagram shows their differences near the Bragg frequency $\omega_0$ at which $\beta(\omega_0) = m\pi/a$. The quantities $\delta$ and $\delta_{eff}$ are defined in the text by Eq. (55a) and Eq. (64).

Figure 7:
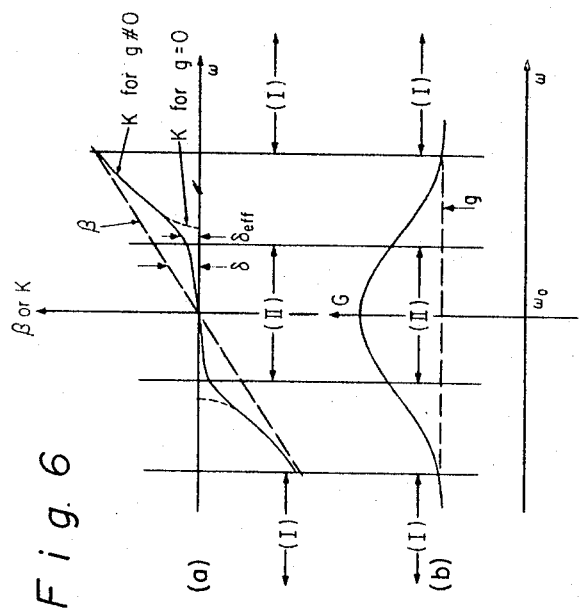

FIG. 7(a and b) are graphs showing the (a) dispersion and (b) the gain curves calculated for a waveguide structure with $n_f = 1.560$ and $n_{s,t} = 1.514$. The other parameters for the structure are shown in the figure. The gain $g$ is assumed to have a half-width of 100 A and a maximum value of 8 cm$^{-1}$ at 5800 A. The calculation is for a structure using the first Bragg condition. For $\lambda > 8400$ A, $\delta$ and $\delta_{eff}$ are positive, and for $\lambda < 8400$ A, $\delta$ and $\delta_{eff}$ are negative.

Figure 8:
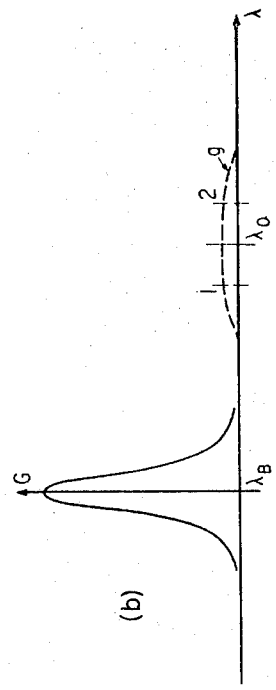

FIG. 8 is a diagram showing the spatial variation of the amplitudes $|U_f|$ and $|U_b|$ of the forward and backward waves. The forward wave starts with zero amplitude at $z = 0$ and builds up its amplitude as it propagates in the $+z$ direction. The diagram is for the case $P_2 << P_1$. In general, $|U_f|$ varies as $[\sinh^2 P_1 z + \sin^2 P_2 z]^{1/2}$ and hence should have small periodic ripples. For the backward wave, $|U_b|$ varies as $[\sinh^2 P_1 (z-L) + \sin^2 P_2 (z-L)]^{1/2}$.

Figure 9:
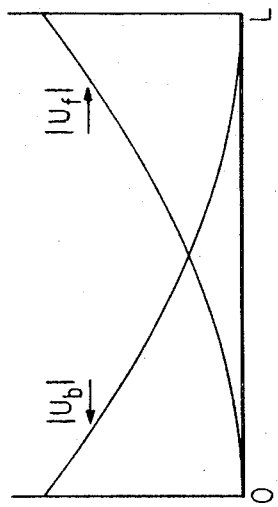

FIG. 9(a and b) are graphs illustrating (a) the dispersion and (b) the gain curves calculated for a GaAs-Ga$_x$Al$_{1-x}$As waveguide corresponding to the case $W = 1.5$ $\mu$m and $q = 0$ in Table 2. The gain $q$ is assumed to have a half width of 100 A and a maximum value of 100 cm$^{-1}$ at 8400 A. In injection lasers, the central wavelength is around 8400 A at 77° K and 8700 A at 300° K. Lasers using band-to-band transition are expected to have a higher photon energy than injection lasers.

Figure 10:
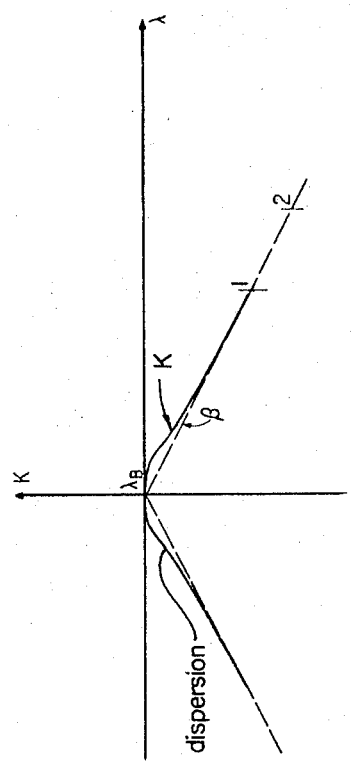

FIG. 10 is a schematic diagram illustrating the mismatch of the Bragg wavelength $\lambda_B$ and the gain profile (a) centered around $\lambda_0$ with (a) representing gain for medium alone and (a) + (b) representing effective gain with added periodic structure. The situation is likely to occur in laser materials with very narrow emission spectrum due to the lack of an accurate control of the period(a) of the waveguide structure.

Figure 11:
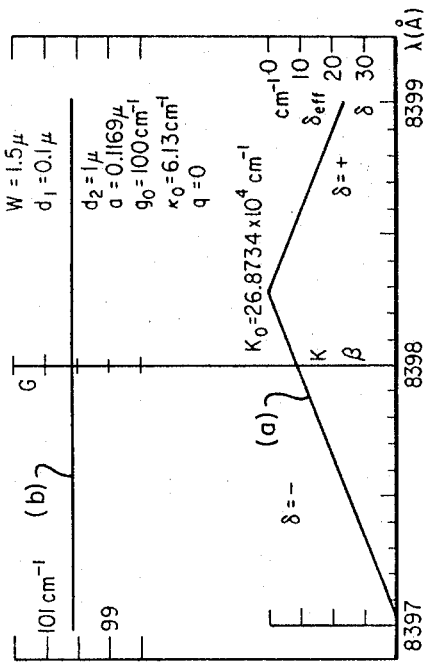

FIG. 11 is a dispersion curve of a laser with mismatched $\lambda_B$ and $\lambda_0$ (FIG. 10). The $\beta$ curve illustrates the performance of a structure with negligible feedback while the $K$ curve illustrates the performance of a similar structure with significant feedback.

I. INTRODUCTION—THEORETICAL ANALYSIS OF THE PRESENT INVENTION

In order to understand the present invention it is helpful to review and amplify certain basic concepts and to develop a theoretical basis for predicting the results of structures constructed in accordance with this invention. The following theoretical discussion uses the editorial, we, throughout, which should be understood to be taken in the first person singular.

In the following discussion, an example is given of the structure of the present invention which consists of a thin film layer serving as a laser medium and which for example may be optically pumped. This layer is sandwiched between a supporting substrate and an upper dielectric layer. The dielectric layer is constructed with periodic alternations of its physical properties such that a reflection is developed both in the dielectric layer and the associated optically pumped thin film laser medium. Laser action results.

The basic structures proposed here consist of a thin film (the laser medium) sandwiched between a substrate and a top dielectric layer. With such structures, we can change the waveguiding property of the structure by varying either the thickness $d$ or the refractive index $n_d$ of the top layer. As $d$ or $n_d$ varies periodically, the transverse wave number $k_x$ in the film changes accordingly. Since $k_x$ and $k_z$ (the longitudinal wave number) are related, a periodic change in $K_x$ produces a corresponding change in $k_z$. The resultant spatial variation in $k_z$ will produce periodically a reflected wave, and this periodic reflection can provide the necessary feedback for laser action.

In Sec. II, the mode conditions for wave propagation in a uniform layered structure are derived by extending the mode analysis of Tien and Ulrich [3]. In Sec. III, scattering at waveguide discontinuities caused by either a change in $d$ or a change in $n_d$ is considered. The effects can be expressed in terms of (i) reflection of the guided mode and (ii) scattering into other modes. Expressions for the feedback coefficient are obtained. In Sec. IV, the loss due to scattering is considered and treated as a problem of diffraction grating produced by the periodic variation of the waveguide structure. Our Analysis follows a method used by Bloembergen and Pershan [4] in their analysis of nonlinear optical interaction at a dielectric interface. In Secs. V and VI, wave propagation in the periodic layered structure is analyzed and coupled-wave equations are set up. The analysis incorporates the effects associated with the periodic structure: (1) the distributed feedback and (2) the loss due to radiation by diffraction grating. In Sec. VII, the practicability of the periodic layered structure for semiconductor, dye, and solid-state lasers is discussed. Computational results for the GaAs − GA$_x$Al$_{1-x}$As and dye laser are presented.

II. MODE CONDITION FOR WAVE PROPAGATION IN LAYERED STRUCTURES

Figure 1:
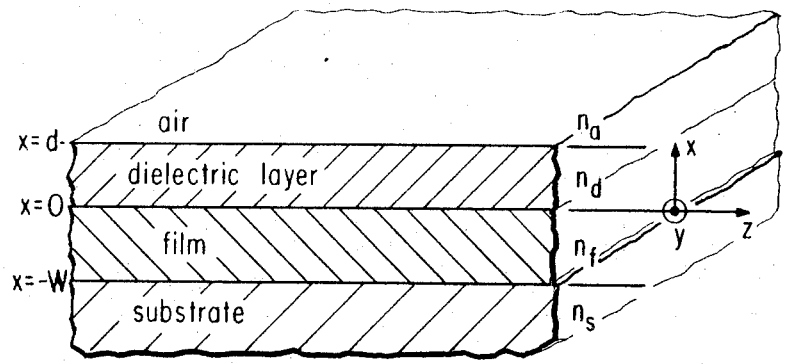
FIG. 1 is a schematic view in cross section of an optical waveguide made of a thin film sandwiched between a substrate and a top dielectric layer.

Consider an optical waveguide (FIG. 1) made of a thin film sandwiched between a substrate and a top dielectric layer. In analyzing the problem of wave propagation, we characterize the structure by four indices of refraction, $n_s$ for the substrate, $n_f$ for the film, $n_d$ for the dielectric layer, and $n_a$ for the medium on top of the dielectric layer. The fourth medium could well be air, but for sake of generality the value of $n_a$ is left unspecified in the analysis. If the materials for the various media are properly chosen with $n_f > n_s$, $n_d$, and $n_a$, there exist certain proper modes of wave propagation for which a wave is totally reflected at the film-substrate and film-top-layer boundaries. In other words, the wave is a wave guided by the film. It is the purpose of this section to find the conditions governing the guided modes.

For the proper modes, the wave is a propagating wave only in the film and becomes an evanescent wave in the other media. Therefore, we can express the electric fields in the various media as $$(E_y)_f = E_{f1} \exp(i\, k_x x) + E_{f2}\exp(-i\, k_x x) \quad (1a)$$

$$(E_y)_d = E_{d1}\exp(p_d x) + E_{d2}\exp(-p_d x) \quad (1b)$$

$$(E_y)_a = E_a\exp[-p_a(x-d)] \quad (1c)$$

$$(E_y)_s = E_s\exp[p_s(x+W)] \quad (1d)$$

In Eq. (1), we assume a TE (transverse electric) polarization for the wave. It is also understood that all the fields have a common phase factor $\exp(i\omega t - i k_z z)$. The three decay constants are given by $$p_d = [(n_f^2 - n_d^2)k_0^2 - k_x^2]^{1/2} \quad (2a)$$

$$p_a = [(n_f^2 - n_a^2)k_0^2 - k_x^2]^{1/2} \quad (2b)$$

$$p_s = [(n_f^2 - n_s^2)k_0^2 - k_x^2]^{1/2} \quad (2c)$$

where $k_x^2 + k_z^2 = n_f^2 k_0^2$ and $k_o$ is the free-space wave number.

By applying the boundary conditions (continuous $E_y$ and $H_z$) at $x = 0$ and $x = d$, and eliminating $E_a$, $E_{d1}$ and $E_{d2}$, we find $$E_{f2}/E_{f1} = (k_x - i\, p_d A)/(k_x + i\, p_d A) = \exp(-i2\phi_{Ed}) \quad (3)$$

where $A = (p_a + p_d \tanh a)/(p_d + p_a \tanh \alpha)$ and $\alpha = p_d d$. Using Eq. (3) in Eq. (1a), we obtain $$(E_y)_f = 2E_{f1}\exp(-i\phi_{Ed})\cos(k_x x + \phi_{Ed}) \quad (4)$$

where the half phase shift at the film-top-layer boundary is $$\phi_{Ed} = \tan^{-1}[p_d/k_x\ p_a + p_d\tanh(p_d d)/P_d + p_a\tanh(p_d d)] \quad (5)$$

Applying the boundary conditions to the film-substrate boundary and eliminating $E_s$, we further obtain $$(E_y)_f = 2\ E_{f1}\exp(-i\, k_x W + i\phi_{Es})\cos(k_x x + k_x W - \phi_{Es}) \quad (6)$$

where the half phase shift at the film-substrate boundary is $$\phi_{Es} = \tan^{-1}\ (p_s/k_x) \quad (7)$$

The condition for the wave to be a proper mode is that Eqs. (4) and (6) must be identical or $$k_x W - \phi_{Es} - \phi_{Ed} = q\pi \quad (8)$$

where $q$ is an integer. Equation (8) governs the selection of a proper mode of TE wave propagation in the layered structure. The only unknown in Eqs. (5), (7), and (8) is $k_x$. Once the values of W, d, $n_f$, $n_d$, $n_a$, and $n_s$ are specified, the value of $k_x$ and hence that of $k_z$ can be determined from Eq. (8) for a given mode number $q$. The electric fields in the various media can be expressed in terms of the field amplitude for $E_E$ in the film as follows:

$$(E_y)_f = E_E\cos(k_x x + \phi_{Ed}) \quad (9a)$$

$$(E_y)_d = E_E\cos(\phi_{Ed})[\cosh(p_d x - \phi_0)]/(\cosh\phi_0) \quad (9b)$$

$$(E_y)_a = E_E\cos(\phi_{Ed})[\cosh(p_d d - \phi_0)]/(\cosh\phi_0)\exp[-p_a(x-d)] \quad (9c)$$

$$(E_y)_s = E_E\cos(\phi_{Ed} - k_x W)\exp[p_s(x+W)] \quad (9d)$$

where $\phi_0 = p_d d + \tanh^{-1}(p_a/p_d)$. For $p_a/p_d > 1$, $\phi_0$ becomes complex and we define $\phi_0' = p_d d + \coth^{-1}(p_a/p_d) = \phi_0 - i\pi/2$. For this case, we substitute $\phi_0'$ for $\phi_0$ and sinh for cosh in Eqs. (9b) and (9c).

Following a similar analysis, we find the equation governing the TM (transverse magnetic) wave propagation to be $$k_x W - \phi_{Ms} - \phi_{Md} = q'\pi \quad (10)$$

where q' is an integer. The half phase shift $$\phi_{Ms} = \tan^{-1}((p_s/k_x)(n_f^2/n_s^2)) \quad (11)$$

is for the film-substrate boundary and the half phase shift $$\phi_{Md} = \tan^{-1}[(p_d n_f^2/k_x n_d^2)(p_a n_d^2 + p_d n_a^2\tanh(p_d d)/p_d n_a^2 + p_a n_d^2\tanh(p_d d))] \quad (12)$$

is for the film-top-layer boundary. For TM polarized waves, we can express the magnetic fields in the various media in terms of the field amplitude $H_M$ in the film as follows:

$$(H_y)_f = H_M\cos(k_x x + \phi_{Md}) \quad (13a)$$

$$(H_y)_d = H_M\cos(\phi_{Md})(\cosh(p_d x - \phi_1))/\cosh\phi_1 \quad (13b)$$

$$(H_y)_a = H_M\cos(\phi_{Md})(\cosh(p_d d - \phi_1))/\cosh\phi_1\exp[-p_a(x-d)] \quad (13c)$$

$$(H_y)_s = H_M\cos(\phi_{Md} - k_x W)\exp[p_s(x+W)] \quad (13d)$$

where $\phi_1 = p_d d + \tanh^{-1}(p_a n_d^2/p_d n_a^2)$.

III. SCATTERING AT WAVEGUIDE DISCONTINUITIES AND DISTRIBUTED FEEDBACK

Figure 2:
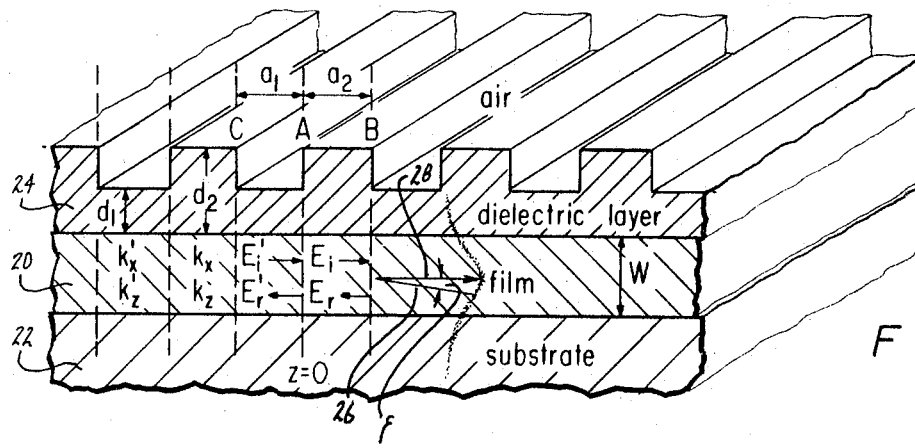
FIG. 2 is a schematic diagram partially in cross section of an optical waveguide with periodic variation in the thickness of the top dielectric layer constructed in accordance with the present invention. Waves $E_i$ and $E_i'$ incident at waveguide discontinuities produce periodically reflected waves $E_r$ and $E_r'$, respectively.

In the analysis presented in Sec. II, we assumed a uniform waveguide for which all the material and physical parameters are constants. In order to provide distributed feedback in the waveguide, we introduce a periodic variation in the thickness d of the top dielectric layer (FIG. 2). As $d$ changes from $d_2$ to $d_1$, the transverse wave number changes accordingly, say from $k_x$ to $k_x'$, as indicated by Eqs. (8) and (10). Since $k_x$ and $k_z$ are related by $k_x^2 + k_z^2 = n_f^2 k_0^2$, a change in $k_x$ produces a corresponding change in $k_z$ (from $k_z$ to $k_z'$). The resultant spatial variation in $k_z$ produces periodically a reflected wave with $$E_r'/E_1' = (k_z' - k_z)/(k_z + k_z') \quad \text{and} \quad E_r/E_i = (k_z - k_z')/(k_z' + k_z) \quad (14)$$

This reflection produces a distributed feedback between waves propagating in the forward and reverse directions.

Equation (14) is used extensively for plane waves. In this section, we analyze the situation for guided waves. In treating wave propagation in distributed lasers, we must take into account any change in the transverse wave number $k_x$ as well as the change in the longitudinal wave number $k_z$. Even in distributed lasers using spatial index variation $\Delta n_f(z)$ in the film, we still face the problem created by the change of the field distributions in the transverse plane because any change in $k_z$ caused by $\Delta n_f$ is necessarily accompanied by a corresponding change in $k_x$ through Eqs. (8) and (10). As the transverse distributions change at the waveguide discontinuities, other waveguide modes, both guided and unguided, are generated. In other words, a guided mode may be scattered into a reflected wave (back-scattering) as well as into other guided or unguided modes.

Since the treatments of the scattering problem are similar for TE and Tm waves, we present in the following discussion only the analysis for the TE wave. Consider the discontinuity at $z = 0$. We let $$E_y = [A \exp(-ik_z'z) + B \exp(ik_z'z)]G_0'(x)$$
$$+ \sum_\ell B_\ell' G_\ell'(x) \exp(ik_{z\ell}'z) \quad (15a)$$

for $0 > z > -a_1$, and $$E_y = C G_0(x) \exp(-i k_z z)$$
$$+ \sum_\ell C_\ell G_\ell(x) \exp(i k_{z\ell} z) \quad (15b)$$

for $a_2 > z > 0$. In Eq. (15), $A$ and $B$ are the complex amplitudes of the incident and reflected wave, respectively, and $C$ is the complex amplitude of the transmitted wave. The coefficients $C_l$ and $B_l'$ are the complex amplitudes of the transmitted and reflected waves for the other modes, guided and unguided. The functions $G_0'(x)$, $G_0(x)$, $G_l'(x)$ and $G_l(x)$ represent the field distributions in the transverse plane associated with the various waves.

Continuity of $E_y$ and $H_x$ at $z = 0$ requires the following relations:

$$(A+B)G_0'(x) + \Sigma B_l' G_l'(x) = C G_0(x) + \Sigma C_l G_l(x) \quad (16a)$$

$$k_z'(A-B)G_0'(x) - \Sigma k_{zl}' B_l' G_l'(x) = k_z C G_0(x) + \Sigma k_{zl} C_l G_l(x) \quad (16b)$$

Multiplying both sides of Eq. (16) by $G_j(x)$ and then integrating the equation over the transverse plane, we obtain $$(A+B)F_{0'j} + \Sigma B_l' F_{l'j} = C F_{0j} + \Sigma C_l F_{lj} \quad (17a)$$

$$k_z'(A-B)F_{0'j} - \Sigma k_{zl}' B_l' F_{l'j} = k_z C F_{0j} + \Sigma k_{zl} C_l F_{lj} \quad (17b)$$

where the various F's are defined as $$F_{0'j} = \int_{-\infty}^{\infty} G_0'(x) G_j(x) dx = \delta_{0j} + O(\Delta d, \Delta n_d) \quad (18a)$$

$$F_{0j} = \int_{-\infty}^{\infty} G_0(x) G_j(x) dx = \delta_{0j} \quad (18b)$$

$$F_{\ell j} = \int_{-\infty}^{\infty} G_\ell(x) G_j(x) dx = \delta_{\ell j} \quad (18c)$$

$$F_{\ell'j} = \int_{-\infty}^{\infty} G_\ell'(x) G_j(x) dx = \delta_{\ell j} + O(\Delta d, \Delta n_d) \quad (18d)$$

It has been pointed out by Marcuse [5] in his analysis of mode conversion in dielectric waveguides that all the guided and unguided modes are orthogonal to all the other modes. Therefore, $F_{0j}$ and $F_{lj}$ are zero if $j \neq 0$ and $j \neq l$. Since the primed functions $G_0'(x)$ and $g_l'(x)$ and the unprimed function $G_j(x)$ belong to different regions of $z$, they are no longer orthogonal. However, $G_0'(x)$ and $G_l'(x)$ differ from $G_0(x)$ and $G_l(x)$ on account of the change in the thickness $d$ or the refractive index $n_d$ of the top dielectric layer. The integrals $F_{0'j}$ and $F_{l'j}$ differ from $F_{0j}$ and $F_{lj}$ by terms which are of first order in $\Delta d$ or $\Delta n_d$. To examine the relative magnitudes of the various terms in Eq. (17), we first let $j = l$. We see that the coefficients $B_l'$ and $C_l$ are of the order of $F_{0'l}$ or $O(\Delta d, \Delta n_d)$. Next, we let $j = 0$. The terms $B_l' F_{l'0}$ and $C_l F_{l0}$ are of the order $O^2(\Delta d, \Delta n_d)$ in comparison with the terms $(A+B)F_{0'0}$ and $CF_{00}$. Therefore, we can approximate the two equations by $$(A+B)F_{0'0} \approx C F_{00} \quad (19a)$$

$$k_z'(A-B)F_{0'0} \approx k_z C f_{00} \quad (19b)$$

Solving for $B$ and $C$ in terms of $A$, we obtain
$$B = k_z' - k_z/k_z' + k_z A, \quad C = 2k_z'/k_z' + k_z \, F_{0'0}/F_{00} \, A$$
(20a, b)

Note that Eq. (20a) which is the same as Eq. (14) is identical to the result obtained for plane waves. Insofar as the reflected wave is concerned, we can treat the distributed feedback as if the transverse distribution remained the same along the z direction. However, the change in $k_x$ at waveguide discontinuities will cause a second order effect which makes energy nonconservative. This effect can be accounted for by introducing a loss term, the scattering loss, in our analysis.

The magnitudes of Poynting's vector are $k_z' A^2 G_0'(x)/\omega\mu_0$, $k_z' B^2 G_0'(x)\omega\mu_0$ and $K_z^2 C^2 G_0(x)/\omega\mu_0$ for the incident, the reflected and the transmitted wave, respectively. Integrating these quantities over the transverse plane, we obtain the ratio $\rho$ of the transmitted and reflected power $p_t + p_r$ to the incident power $p_i$. This ratio is $$\rho = (k_z' B^2 F_{0'0'} + k_z C^2 F_{00}/k_z' A^2 F_{0'0'}) = 1 - (4k_z k_z')/(k_z' + k_z)^2 (1 - F_{0'0'}^2/F_{00} F_{0'0'}) \quad (21a)$$

Since $4k_z k_z'/(k_z + k_z')^2 = 1 - (\Delta k_z/2k_z)^2$ which is of the second order in $\Delta d$ or $\Delta n_d$, the percentage loss due to scattering into other modes is $\eta_s = 1 - \rho$ which can be approximated by $$\eta_s \approx 1 - F_{0'0'}^2/F_{00} F_{0'0'} \quad (21b)$$

Note that $\eta_s$ is a function of the transverse distribution only.

Eq. (21b) is based on a single waveguide discontinuity. In a waveguide with periodic structural changes, the phase coherence between the effects produced by all the waveguide discontinuities becomes important. To illustrate the point, we consider the scattering of a guided mode into an unguided mode. Since an unguided mode radiates energy from the waveguide into the surrounding space, we may treat each discontinuity as an antenna. From antenna theory [6], we know that the radiation field produced by an antenna array can be obtained from the radiation field for a single antenna by multiplying it with an array factor $F_a$. The phase difference $\phi_i$ between the incident fields A at two discontinuities separated by the period a is $\phi_i = -k_z a$, whereas the propagation-phase difference between the radiation fields due to the unguided mode $l$ from the same discontinuities is $\phi_p = k_{zl} a$. Thus, the array factor $F_a$ is $$F_a = \sum_{n=0}^{N} \exp[i n (\phi_i + \phi_p)]$$

$$= \frac{\sin[N(k_{z\ell} - k_z)a/2]}{\sin[(k_{z\ell} - k_z)a/2]} \quad (22)$$

where $N$ is the total number of waveguide periods.

For large $N$ which is needed in distributed lasers, the value of $F_a$ is $N$ (that means, all the antennas radiate constructively) only if $(k_{zl}-k_l) a/2 = \pm m\pi$. Therefore, only those modes with $$k_{zl} = k_z \pm m 2\pi/a \tag{23}$$

are important, where $m$ = an integer is the order of Bragg scattering.

For the back-scattering process which is used to provide the distributed feedback, $k_{zl} = -k_z$ and hence the condition for the periodicity $a$ should be such that $a = m\pi_g/2$ where $\lambda_g = 2\pi/k_z$ is the guided wavelength. The other guided modes which are unwanted will have a value of $k_{zl}$ different from $-k_z$. Therefore, it is possible to design a distributed laser for which Equations 23 and 23a will be satisfied for one selected guided mode but not for other possible guided modes.

In summary, we treat the problem of scattering in a periodic waveguide in terms of two physical parameters, a feedback coefficient which accounts for the back-scattering process and a radiation-loss coefficient which accounts for the scattering into the radiation modes of the guide. The loss of a guided mode due to scattering into the radiation modes will be furthered discussed in Sec. IV. On the other hand, our experience [7] with waveguide modulators shows that there is little energy exchange between two waveguide modes if Eq. (23) is not satisfied. Therefore, scattering of a guided mode into another guided mode will not be further considered.

The magnitude of the feedback can be found by first computing $\Delta k_x = k_x' - k_x$ and then relating $\Delta k_x$ to $\Delta k_z = k_z' - k_z = -k_x \Delta k_x/k_z$. Since the amount of $\Delta k_z/k_z$ required for distributed feedback is quite small, the values of $p_d d$ in Eqs. (5) and (12) are expected to be larger than 1. For cases with $p_d d > 1$, $\tanh(p_d d) \approx 1 - 2\exp(-2p_d d)$, and thus Eqs. (5) and (12) can be approximated by $$\tan(\phi_{Ed}) \approx p_d/k_x [1 + (2(p_a - p_d))/(p_d + p_a) \exp(-2p_d d)] \tag{24a}$$

$$\tan(\phi_{Md}) \approx p_d n_f^2/k_x n_d^2 [1 + (2(p_a n_d^2 - p_d n_a^2))/(p_a n_d^2 + p_d n_a^2) \exp(-2p_d d)] \tag{24b}$$

For a TE wave to be a propagating mode of the guide, Eq. (8) should be satisfied for both $k_x$ and $k_x'$. In other words, $W\Delta k_x - \Delta\phi_{Es} - \Delta\phi_{Ed} = 0$, yielding $$\Delta k_x/k_x = [-2/(l_d + l_s + W)l_d \, 1/p_d^2 + k_x^2 \, p_a - p_d/p_a + p_d] \exp(-2p_d d_1) \tag{25a}$$

where $l_d = p_a^{-1}$ and $l_s = p_s^{-1}$ represent the penetration depth of the evanescent wave into the top dielectric layer and the substrate, respectively. For a TM wave, the corresponding quantity is $$\Delta k_x/k_x = [-2/l_d' + l_s' + W)l_d' 1/p_d^2 + k_x^2 \, P_a \, n_d^2 - p_a n_a^{2/} p_a \, n_d^2 + p_d \, n_a^2] \exp(-2p_d d_1) \tag{25b}$$

where $l_d' = l_d(k_x^2 n_d^4 + p_d^2 n_f^4)/[n_f^2 n_d^2(p_d^2 + k_x^2)]$ and $l_s' = l_s(k_x^2 n_s^4 + p_s^2 n_f^4)/[n_f^2 n_s^2(p_s^2 + k_x^2)]$. In obtaining Eq. (25), the assumption $p_d(d_2 - d_1) > 1$ is made so that $\Delta \exp(-2p_d d)$ can be approximated by $\exp(-2p_d d_1)$. Further, only the first-order terms in $\Delta$ are kept. From Eq. (25a), the amount of distributed feedback for a TE wave is $$r = |\Delta k_z/2k_z| = (k_x/k_z)^2 (l_{fd}^2/l_d(l_d+l_s+W)) (l_d - l_a/l_d + l_a) \exp(-2d_1/l_d) \tag{26}$$

where $l_a = p_a^{-1}$, $l_{fd} = \delta_0/2\pi(n_f^2 - n_d^2)^{1/2}$ and $\delta_0$ is the free-space wavelength. A similar expression for $r$ can be obtained from Eq. (25b) for a TM wave.

Another possible periodic structure capable of providing distributed feedback is the one shown in FIG. 3a where the top dielectric layer is made of two materials of slightly different indices of refraction but of the same thickness. Let us consider a simple case in which $d$ is sufficiently thick so that $\tanh p_d d$ can be replaced by 1 in Eqs. (5) and (12). In other words, the structure shown in FIG. 3a should behave as if the top dielectric layer were semi-infinite in extent (FIG. 3b). Thus, by differentiating Eqs. (8) and (10), we find the change in $k_x$ caused by the change in $n_d$ to be $$\Delta k_x/k_x = (l_d/W + l_d + l_s)(-n_d \Delta n_d/n_f^2 - n_d^2) \tag{27a}$$

for a TE wave and $$\Delta k_x/k_x = (l_d'/W + l_d' + l_s')(k_z^2/k_0^2 n_d^2)(-n_d \Delta n_d/n_f^2 - n_d^2) \tag{27b}$$

for a TM wave. The quantities $l_d'$ and $l_s'$ are the same as those in Eq. (25b). Using Eq. (27), the feedback coefficient $r$ can be found.

IV. RADIATION LOSS DUE TO GRATING EFFECTS

In this section, we consider the loss due to scattering into the radiation modes. We know that a diffraction grating is based on a periodic phase variation [8] at the interface of two dielectric materials. Such a periodic variation exists for the structures shown in FIGS. 2 and 3. To analyze the grating effect, we first convert the thickness variation (FIG. 2) or the index variation (FIG. 3) of the top layer in terms of an equivalent index variation of the film. Differentiating Eq. (8) with respect to $n_f$ and $d$ or $n_d$, we find $$n_f \Delta n_f [1 + l_s(n_f^2 - n_d^2)/l_d(n_f^2 - n_s^2)] = (2/k_0^2 \, l_d^2)(l_d - l_a/l_d + l_a) \exp(-d_1/l_d) \tag{28a}$$

$$n_f \Delta n_f [1 + l_s(n_f^2 - n_d^2)/l_d(n_f^2 - n_s^2)] = -n_d \Delta n_d \tag{28b}$$

Equation (28) is derived for a TE wave. Further, in Eq. (28a), the change $\Delta \exp(-2d/l_d)$ is replaced by $\exp(-2d_1/l_d)$. Similar expressions can be obtained from Eq. (10) for a TM wave.

The reason for deriving Eq. (28) is that we can now replace the structures of FIGS. 2 and 3 by the structure of FIG. 1 in which wave propagation can be described by the followinng wave equation $$\delta^2 E_y/\delta x^2 + \delta^2 E_y/\delta z^2 + [n_f^2 + 2n_f \Delta n_f(z)]k_0^2 E_y = 0 \tag{29}$$

The index variation $\Delta n_f(z)$ can be expanded into a Fourier series as follows:

$$\Delta n_f(z) = \Sigma \, n_f 2\Delta/m \, \pi \, i \, [\exp(i \, 2\pi/a \, mz) - \exp(-i \, 2\pi/a \, mz)] \tag{30}$$

where $\Delta = \Delta n_f/n_f$ with $\Delta n_f$ given by either Eq. (28a) or (28b). Wave interaction of the kind described by Eq. (29) has been discussed in the literature [5,9–12]. Here we shall adopt the procedure used by Bloembergen and Pershan [4] in their analysis of nonlinear interaction at a dielectric interface. The interaction of an incident wave $E_y = E_i \exp(i\omega t - i k_x x - i k_z z)$ with $\Delta n_f(z)$ produces driving terms with a typical source function $$S_m = 4n_f^2 k_0^2 \Delta/m \, \pi \, i \, E_i \exp(i\omega t - i k_x x - i k_{zm} z) \tag{31}$$

where $k_{zm} = k_z - 2\pi/a \, m$ (32)

Let $E_y'$ represent the total electric field due to the modes excited by the grated effect. We can express $E_y'$ in terms of many components $E_{ym}$, each component being characterized by a different $k_{zm}$. The wave equation for a typical component $E_{ym}$ is given by $$\delta^2 E_{ym}/\delta x^2 + \delta^2 E_{ym}/\delta z^2 + n_f^2 k_0^2 E_{ym} = -S_m \tag{33}$$

As pointed out by Bloembergen and Pershan, the general solution of Eq. (33) consists of the particular solution of the inhomogeneous equation plus the complementary solution of the homogeneous equation. In the film, we have $$(E_{ym})_f = E^S \exp(-i k_x x) + E_{ml} \exp(i k_{xm} x) \quad (34a)$$

In the top dielectric layer and air, we have $$(E_{ym})_d = E_{m2} \exp(-i k_{xm}^d x) + E_{m3} \exp(i k_{xm}^d x) \quad (34b)$$

$$(E_{ym})_a = E_{m4} \exp(-i k_{xm}^a x) \quad (34c)$$

Figure 4:
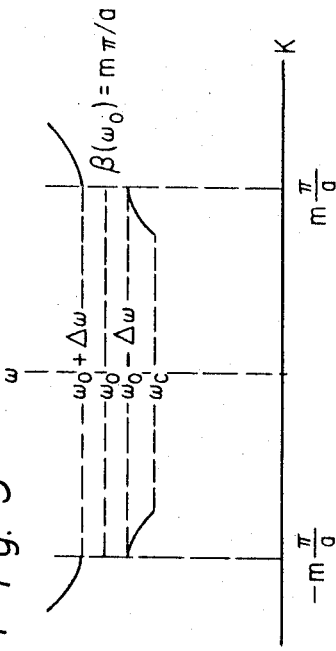
FIG. 4 is a schematic diagram illustrating the grating effect. The incident field $E_2$ interacting with the periodic phase variation produces a source field $E^S$ which in turn produces a reflected field $E_{ml}$ (back to the film) and a transmitted field $E_{m4}$ (into air).

The physical situation as represented by Eq. (34) is illustrated in FIG. 4. In Eq. (34), the common phase factor $\exp(i\omega t - i k_{zm} z)$ is again omitted.

The particular solution $E^S$ can easily be obtained by substituting the $E^S$ part of Eq. (34a) into Eq. (33). The amplitude $E^S$ is $$E^S = -4 n_f^2 \Delta/m \pi i k_0^2 E_i/n_f^2 k_0^2 - k_x^2 - k_{zm}^2 \quad (35)$$

which physically represents the amplitude of the wave driven by the source function $S_m$. One important difference between the particular and complementary solution is the fact that for $E^S$, $$n_f^2 k_0^2 - k_x^2 - k_{zm}^2 = k_z^2 - k_{zm}^2 = k_{xm}^2 - k_x^2 \quad (36a)$$

whereas for $E_{ml}$ $$n_f^2 k_0^2 - k_{xm}^2 - k_{zm}^2 = 0 \quad (36b)$$

Equations similar to Eq. (36b) also hold for $E_{m2}$, $E_{m3}$, and $E_{m4}$. Applying the boundary conditions to the fields, we can express $E_{m4}$ in terms of $E^S$ and thus obtain $|E_{m4}/E_i| = [2n_f^2 k_0^2 \Delta/\pi m(k_{xm}-k_x)](k_1^2 \cos^2 \alpha' + k_2^2 \sin^2 \alpha')^{-1/2}$ (37)

where $k_1 = k_{xm} + k_{xm}^a$, $k_2 = k_{xm}^d + k_{xm} k_{xm}^a)/k_{xm}^d$, and $\alpha' = k_{xm}^d d$.

Although there are an infinite number of terms involved in the summation of Eq. (30), the actual number of modes which will contribute to radiation are limited. The radiation field $E_{m4}$ has a longitudinal wave number $k_{zm}^a$ equal to $k_{zm}$; therefore, the following condition exists $$\sin \theta_r^a = n_f \sin \theta_i^f - \lambda 0/a \; m = n_f \sin \theta_r^f \quad (38a)$$

where $\theta_i^f$ and $\theta_r^a$ (FIG. 4) are the angle of incidence for the field $E_i$ in the film and the angle of refraction for the field $E_{m4}$ in the air. Let us suppose that we choose the periodicity $a$ such that for $m = m_0$, the condition $k_{zm} = -k_z$ or $m_0 \, 2\pi/a = 2k_z$ is satisfied. In terms of $m_0$, Eq. (38b) becomes $$\sin \theta_r^a = n_f \sin \theta_i^f (1 - 2m/m_0) = n_f \sin \theta_r^f \quad (38b)$$

For a mode to be radiating, $|\sin \theta_r^a| < 1$. In Table 1, we present the calculations for GaAs and Pb glass films with $m_0 = 7, 5,$ and 3. Only odd modes are generated by the square wave of Eq (30). The values of 3.5 and 1.7 are chosen for $n_f \sin \theta_i^f$ for the GaAs and Pb glass guide, respectively. As we can see, a film with a higher index of refraction serves much better as a guide than a film with a lower index of refraction. For $m_0 = 7$, a GaAs guide has only 1 radiation mode as compared to 2 for a Pb glass guide. For $m_0 = 3$, there is no radiation mode for a GaAs guide.

Besides radiating into air, a guided film mode can be scattered into a substrate mode[13] (indicated by $S$ in Table 1). Since the substrate index is generally chosen to be close to the film index we expect that the values of $k_z$ for all the modes marked $S$ in Table 1 will fall in the range for the substrate modes. Further, because of the thickness of the substrate, the substrate modes are very densely packed as compared to the film modes.

TABLE 1

Radiation modes for GaAs and Pb glass waveguides with periodic layered structures. The value of $n_f \sin \theta_i^f$ is chosen to be 3.5 for the GaAs guide and 1.7 for the Pb glass guide. The following symbols are used to indicate the nature of the mode: R for radiating mode, S for scattering into a substrate mode and B for back-scattering to provide the feedback.

| Material | $m_0$ | \multicolumn{4}{c}{value of $\sin \theta_r^a$ or $n_f \sin \theta_r^f$} |
|---|---|---|---|---|---|
| | | $m = 1$ | 3 | 5 | 7 |
| GaAs | 7 | 2.50(S) | 0.50(R) | −1.50(S) | −3.50(B) |
| | 5 | 2.10(S) | −0.70(R) | −3.50(B) | |
| | 3 | 1.17(S) | −3.50(B) | | |
| Pb glass | 7 | 1.22(S) | 0.24(R) | −0.73(R) | −1.70(B) |
| | 5 | 1.02(S) | −0.34(R) | −1.70(B) | |
| | 3 | 0.57(R) | −1.70(B) | | |

Therefore, we expect that all the $S$ modes in Table 1 will become a substrate mode. For an analysis of the process of scattering into a substrate mode (which is guided), we can use Eq. (17). Letting $j = l'$ and using the orthogonality condition, we can solve for $B_l'$ in terms of $C$ and thus obtain $$B_l' = (k_{zl} - k_z/k_{zl} + k_{zl}')(2k_z'/k_z + k_z')(F_{0'} o/F_{00})(F_{0l'}/F_{l'l'})A \quad (39)$$

V. GAIN AND PHASE CONSTANTS IN PERIODIC LAYERED STRUCTURES

After we know how to account for the effects produced by the term $\delta^2 E_y/\delta x^2$ in the wave equation, we can reduce the analysis from a two-dimensional to a one-dimensional problem. Wave propagation in a periodic layered structure either of the type shown in FIG. 2 or of the type shown in FIG. 3 can be described by $$\delta^2 E_y/\delta z^2 - \gamma^2 E_y = 0 \quad (40)$$

where the propagation constant $\gamma$ is $$\gamma = g - i k_z = \gamma_2 \text{ for } a_2 > z > 0 = g - i k_z' = \gamma_1 \text{ for } 0 > z > -a_1 \quad (41)$$

As discussed in Sec. IV, the periodic variation of the waveguide structure introduces radiation losses. Therefore, the gain factor $g$ is Eq. (41) is $$g = g_f - \sqrt{(\eta_R)_A}/2W \tan \theta_i^f - \sqrt{(\eta_R)_S}/a \quad (42)$$

where $g_f$ is the gain factor of the laser medium (film). The quantity $(\eta_R)_A$ is the percentage of power loss due to radiation into air, which can be obtained from Eq. (37) as the ratio of the radiated power to the incident power or $$(\eta_R)_A = \sum \left| \frac{n_a E_{m4}^2}{n_f E_i^2} \right| =$$

$$\sum_{m'} \left[ \frac{n_f k_0^2 2\Delta}{\pi m(k_{xm} - k_x)} \right]^2 \frac{n_a n_f}{k_1^2 \cos^2 \alpha' + k_2^2 \sin^2 \alpha'} \quad (43a)$$

where the summation is over all the radiating modes $m = m'$. In Eq. (42), the loss $\sqrt{(\eta_R)_A}$ in field amplitude is averaged over the distance $2W \tan \theta_i^f$ between two successive incidences at the boundary. The quantity $(\eta_R)_S$ is the percentage of power loss due to radiation into substrate modes. From Eq. (39), we obtain $$(\eta_R)_S = \sum_\ell \left| \frac{k_{z\ell'} \, B_{\ell'}^2 \, F_{\ell'\ell'}}{k_z \, A^2 \, F_{00}} \right| \simeq$$

$$\sum_\ell \frac{(k_{z\ell} - k_z)^2}{4 \, k_z \, k_{z\ell}} \frac{F_{0\ell'}^2}{F_{00} \, F_{\ell'\ell'}} \quad (43b)$$

where the approximations $F_{0'0} \simeq F_{0\,0}$ and $k_{zl} \simeq k_{zl'}$ are made. In Eq. (42), the loss $\sqrt{(\eta_R)_S}$ in field amplitude is averaged over the period $a = a_1 + a_2$ of the waveguide structure.

Equation (40) with $\gamma$ given by Eq. (41) is in the form of Hill's equation. It has a solution of the form
$$E_y = A \exp(-\gamma_2 z) + B \exp(\gamma_2 z) \quad (44a)$$
for $a_2 > z > 0$ and
$$E_y = C \exp(-\gamma_2 z) + D \exp(\gamma_2 z) \quad (44b)$$

for $0 > z > -a_1$. According to Floquet's theorem for differential equations with a periodic potential, the field amplitude must obey the relation
$$E_y(z+a) = E_y(z) \exp(\Gamma a) \quad (45)$$

A wave represented by Eq. (45) is known as the Bloch wave. Applying the continuity condition of $E_y$ and $H_x$ (that is, $\delta E_y/\delta z$) to Eq. (44) and using Eq. (45), we obtain the following characteristic equation $$\cosh(\Gamma a) = \cosh(\gamma_1 \, a_1) \cosh(\gamma_2 \, a_2) + \tfrac{1}{2} \, (\gamma_1/\gamma_2 + \gamma_2/\gamma_1) \sinh(\gamma_1 \, a_1) \sinh(\gamma_2 \, a_2) \quad (46)$$

which is the same as the result obtained by Strutt for Hill's equation with a rectangular potential [11].

Since the laser medium provides gain, the factor $\exp(\Gamma a)$ in Eq. (45) can be separated into a gain factor $\exp(Ga)$ and a phase factor $\exp(-iKa)$ with
$$\Gamma = G - iK \quad (47)$$

Wave propagation in the periodic waveguide can be described by an electric field
$$E_y(z) = E_f \exp[(G-iK)z] + E_b \exp[-(G-iK)z] \quad (48)$$

with $E_f$ representing the forward wave (propagating in the $+z$ direction) and $E_b$ representing the backward wave. Both the forward and backward waves increase in amplitude as they propagate. Equation (48) is for TE waves and a similar expression is obtained for TM waves by using $H_y(z)$ instead of $E_y(z)$. The field distribution in the transverse plane ($xy$ plane) is not explicitly stated in Eq. (48) because any variation in the distribution is accounted for $(\eta_R)_A$ and $(\eta_R)_S$.

For $a_1 = a_2 = a/2$, Eq. (46) can be simplified into the following form,
$$\cosh(Ga - iKa) = \cosh(ga - i\beta a) - (\Delta\beta)^2/(g - i\beta)^2 [\cosh(ga - i\beta a) - \cos(a\Delta\beta)] \quad (49)$$
where
$$\beta = (k_z + k_z')/2 \text{ and } \Delta\beta = (k_z - k_z')/2 \quad (50)$$

Note that the right-hand side of Eq. (49) changes with the operating frequency $\omega$ on account of the $\omega$ dependencies of $g$, $k_z$, and $k_z'$. Therefore, both $G$ and $K$ are functions of $\omega$. Especially important is the dependence of $K$ on $\omega$. Let us examine the case with the gain balancing out the loss. For $g = G = 0$, we have
$$\cos Ka = [1 + (\Delta\beta/\beta)^2] \cos \beta a - (\Delta\beta/\beta)^2 \cos(a\Delta\beta) \quad (51)$$

Suppose that the first-order Bragg condition occurs at $\omega_0$. Thus $\beta(\omega_0)a = \pi$. It is obvious from Eq. (51) that $\cos Ka < -1$ for $\omega = \omega_0$. Therefore, there exists a forbidden gap for $\omega$, within which wave propagation is blocked. This situation is illustrated in FIG. 5. Similar dispersion diagrams have been obtained in other time-space periodic media [14]. The half width of the frequency gap is $\Delta\omega = (2\Delta\beta/\pi)(\delta\beta/\delta\omega)^{-1}$. However, it is well known in solid-state band theory that the band gap disappears in the complex $k$ plane. Similarly, the frequency gap will disappear for laser media with gain. This is illustrated in FIG. 6a and confirmed by the calculated results shown in FIG. 7a.

VI. COUPLED-WAVE EQUATIONS AND LASER OSCILLATION CONDITION

In Sec. V, we analyzed wave propagation in a periodic layered structure in terms of a gain constant G and a phase constant K. If the value of K is away from the Bragg condition, then the two waves $E_f$ and $E_b$ in Eq. (48) are independent of each other. For such cases, Eq. (48) is the final solution of the wave equation, with $E_f$ and $E_b$ being two independent constants. On the other hand, if the Bragg condition is satisfied, the two waves are coupled to each other. As a result of this coupling, the eigen mode of the laser medium is an admixture of the two coupled waves. In the following discussion, the situation near the Bragg condition (with $2\beta$ close to $2\pi m/a$) is analyzed.

To analyze the coupled-wave problem, we write the wave equation as
$$\delta^2 E_y/\delta z^2 - (g-\beta)^2 E_y = \Sigma -8 \, \beta\Delta\beta/\pi m \sin(m2\pi/a \, z) E_y \quad (52)$$

which is derived from Eq. (29) by incorporating and converting $\Delta n_f$ into $\Delta k_z = 2\Delta\beta$. We propose a solution of the form:
$$E_y(z) = U_f'(z) \exp(-i\beta z) + U_b'(z) \exp(i\beta z) \quad (53)$$

Substitution of Eq. (53) into Eq. (52) yields
$$\delta U_f'/\delta z - g U_f' = U_b' \exp(-2i\delta z) \quad (54a)$$

$$\delta U_b'/\delta z + g U_b' = U_f' \exp(2i\delta z) \quad (54b)$$

Equation (54) is obtained by collecting separately terms with $\exp(\pm i\beta z)$ dependences and by neglecting the small difference between $^2U_{f,b}'/z^2$ and $g^2 U_{f,b}'$. The two parameters $\delta$ and are defined as
$$\delta = m\pi/a - \beta \quad (55a)$$

$$= 2\Delta\beta/m\pi = 2r/a \quad (55b)$$

Letting $U_f' = U_f'' \exp(-i\delta z)$ and $U_b' = U_b'' \exp(i\delta z)$ in Eq. (54) and then eliminating $U_b''$, we obtain
$$\delta^2 U_f''/\delta z^2 = [(g+i\delta)^2 + ^2] U_f'' \quad (56)$$

Equation (56) has a general solution of the form
$$U_f'' = u_1 \exp(-Pz) + u_2 \exp(Pz) \quad (57a)$$

$$U_b'' = u_3 \exp(-Pz) + u_4 \exp(Pz) \quad (57b)$$

where the complex constant P is
$$P = [^2 + (g+i\delta)^2]^{1/2} = P_1 + i P_2 \quad (58)$$

To see the physical meaning of this mathematical exercise, we substitute Eq. (57) into Eq. (53) and obtain
$$E_y = [u_1 \exp(-Pz) + u_2 \exp(Pz)] \exp[-i(\delta + \delta)z] + [u_3 \exp(-Pz) + u_3 \exp(Pz)] \exp[i(\beta + \delta)z] \quad (59)$$

If we let $G = P_1$ and $K = \beta + \delta - P_2$, then the terms $u_2$ and $u_3$ will have, respectively, the same z-dependence as the terms $U_f$ and $U_b$ in Eq. (48). It can also be shown that the terms $u_1$ and $u_4$ have an exp $[\mp (G - iK - 2\pi m/a)z]$ dependence. Therefore, these two terms are generated, respectively, by the scattering of the waves $U_b$ and $U_f$ by the periodic structure.

To show that $P_1$ and $P_2$ are indeed related to $G$ and $K$, we make the following observations. The quantities $P_1$ and $P_2$ can be found from Eq. (58). For $\delta^2 >> g^2 + {}^2$, $P_1 \cong g$ and $P_2 \cong \delta$. In this region designated as I, $G - iK$ can be approximated by $g - i\beta$. For $\delta^2 >> g^2 + {}^2$, $P_1 \cong \sqrt{g^2 + {}^2}$ and $P_2 \cong \delta g/\sqrt{g^2 + {}^2}$. In this region designated as II, the effective gain $G$ can become considerably greater than $g$ whereas the actual wave number $K$ can move closer to the Bragg condition than $\beta$. The expected behavior of $G$ and $K$ is shown in FIG. 6 as a function of $\omega$. The calculated values of $G$ and $K$ for a specific waveguide structure are plotted in FIG. 7. The values calculated from Eq. (49) indeed agree with those from Eq. (58) in the two distinct regions $\delta^2 >>$ or $<< g^2 + {}^2$. For example, the value of $G$ is equal to $(g^2 + )^{1/2}$ and $K = 0$ at the wavelength where the Bragg condition is satisfied. In the subsequent discussions, we use the values of $G$ and $K$ calculated from Eq. (49) because they can be accurately evaluated whereas approximations are used in the coupled-wave analysis.

Now let us discuss the conditions for laser oscillation. Suppose that the distributed-laser structure starts at $z = 0$ and ends at $z = L$. Thus, for the forward wave $U_f'' = 0$ at $z = 0$ and for the backward wave $U_b'' = 0$ at $z = L$. Use of the first condition results in the following dependence $$U_f'' = u_0 \sinh(Pz) \qquad (60a)$$

with $u_0 = 2u_2 = -2u_1$. The coefficients $u_3$ and $u_4$ are related, respectively, to $u_1$ and $u_2$, and their relations can be found by substituting Eq. (57) into Eq. (54). In terms of $u_0$, Eq. (57b) becomes $$U_b'' = u_0/2[(g+i\delta-P)\exp(exp(Pz) - (g+i\delta+P)\exp(-Pz)] \qquad (57b')$$

Use of the second condition at $z = L$ yields the following characteristic equation for the laser mode:

$$\exp(PL) = (g + i\delta + P/g + i\delta - P)^{1/2} = g + i\delta + P/+ i \qquad (61)$$

Substituting Eq. (61) back into Eq. (57b'), we find $$U_b'' = -i u_0 \sinh[P(L-z)] \qquad (60b)$$

The spatial variation of $U_f$ and $U_b$ is illustrated in FIG. 8.

Equations (60) and (61) are similar to the expressions obtained by Kogelnik and Snank[15] except for the factor $-i$ in $U_b''$. The important difference in the two analysis is that a plane wave solution is assumed by Kogelnik and Shank whereas a guided wave solution is used. We also have shown that the values of $P_1$ and $P_2$ for Eq. (61) can be accurately calculated from Eq. (46). The threshold condition for laser oscillation is determined by the magnitude of Eq. (61). Oscillation occurs when $$|\kappa| \exp(GL) \gg |g + i\delta + P| = |g + G + i\delta + i\delta_{eff}| \qquad (62)$$

The resonance condition is determined by the phase factor in Eq. (61). The frequency of the laser mode is such that $$\delta_{eff}L = \text{phase}(g+i\delta+P) \pm \pi/2 = \text{phase }(g + G + i\delta + i\delta_{eff}) \pm \pi/2 \qquad (63)$$

where $\delta_{eff}$ which is shown in FIG. 7a is defined as $$\delta_{eff} = P_2 = m\pi/a - K \qquad (64)$$

Note that there is a phase difference of $\pi/2$ between $U_f''$ and $U_b''$. Because of this phase difference, a distributed laser can meet the phase requirement only at a wavelength away from the exact Bragg condition. The detuning from the Bragg condition is measured by the quantities $\delta$ and $\delta_{eff}$.

We should add that Eq. (63) can be satisfied for different values of $\delta_{eff}$. This gives rise to the longitudinal modes of a laser. Since the mode spectrum of distributed lasers have been extensively analyzed by Kogelnik and Shank, the reader is referred to the aforementioned article [15] for further discussions. It suffices to point out here that coupling between $U_f$ and $U_b$ can also be achieved through the gain mechanism by introducing periodic spatial variation in $g$. For gain coupling, we replace $i$ by in Eq. (61) and $iu_0$ by $u_0$ in Eq. (60b). Since $U_f''$ and $U_b''$ are now in phase at the Bragg frequency, a distributed laser can be operated at that frequency.

VII. COMPUTATIONAL RESULTS FOR SEVERAL DISTRIBUTED-LASER STRUCTURES

In this section, we apply the results of our analysis given in the previous sections to several distributed-laser structures to see whether the proposed scheme is practicable or not. We concentrate our discussion on the following physical requirements of a laser: (1) the period $a$ of the waveguide structure; (2) the linear dimension $L$ of the laser; and (3) the pumping power needed. The first laser system we consider is the GaAs

TABLE 2

Period $a$, relative change in longitudinal wave number $\Delta k_z/2k_z$, relative change in transverse wave number $\Delta k_x/k_x$, and equivalent film index variation $\Delta n_f$ in GaAs - $Ga_xAl_{1-x}$ As waveguides with $d_1 = 0.1$ $\mu m$, $d_2 = 1.0$ $\mu m$, and $n_f - n_{s,t} = 0.15$. The calculation is designated for first-order Bragg diffraction at $\lambda = 8400$ Å and made for several film thickness $W$ and several transverse mode number $q$.

| W ($\mu m$) | q | a ($\mu m$) | $\Delta\beta/\beta = \Delta k_z/2k_z$ | $\Delta k_x/k_x$ | $(\Delta n_f/n_f)_{FB}$ | $(\Delta n_f/n_f)_{RL}$ | $\eta_s$ |
|---|---|---|---|---|---|---|---|
| 1.0 | 0 | 0.1172 | $1.02 \times 10^{-4}$ | $2.21 \times 10^{-2}$ | $2.03 \times 10^{-4}$ | $9.48 \times 10^{-3}$ | $3.70 \times 10^{-3}$ |
|  | 1 | 0.1187 | $4.87 \times 10^{-4}$ | $2.80 \times 10^{-2}$ | $9.73 \times 10^{-4}$ | $9.16 \times 10^{-3}$ |  |
|  | 2 | 0.1210 | $1.44 \times 10^{-3}$ | $3.84 \times 10^{-2}$ | $2.87 \times 10^{-3}$ | $6.55 \times 10^{-3}$ |  |
| 1.5 | 0 | 0.1169 | $3.58 \times 10^{-5}$ | $1.60 \times 10^{-2}$ | $7.16 \times 10^{-5}$ | $9.46 \times 10^{-3}$ | $1.53 \times 10^{-3}$ |
|  | 1 | 0.1177 | $1.59 \times 10^{-4}$ | $1.77 \times 10^{-2}$ | $3.18 \times 10^{-4}$ | $9.47 \times 10^{-3}$ |  |
|  | 2 | 0.1190 | $4.34 \times 10^{-4}$ | $2.12 \times 10^{-2}$ | $8.68 \times 10^{-4}$ | $8.90 \times 10^{-3}$ |  |
| 2.0 | 0 | 0.1168 | $1.67 \times 10^{-5}$ | $1.23 \times 10^{-2}$ | $3.3 \times 10^{-5}$ | $9.44 \times 10^{-3}$ | $8.23 \times 10^{-4}$ |
|  | 1 | 0.1173 | $7.15 \times 10^{-5}$ | $1.31 \times 10^{-2}$ | $1.43 \times 10^{-4}$ | $9.48 \times 10^{-3}$ |  |
|  | 2 | 0.1181 | $1.79 \times 10^{-4}$ | $1.46 \times 10^{-2}$ | $3.58 \times 10^{-4}$ | $9.38 \times 10^{-3}$ |  |
| 3.0 | 0 | 0.1167 | $5.45 \times 10^{-6}$ | $8.35 \times 10^{-3}$ | $1.09 \times 10^{-5}$ | $9.43 \times 10^{-3}$ | $3.45 \times 10^{-4}$ |
|  | 1 | 0.1170 | $2.25 \times 10^{-5}$ | $8.65 \times 10^{-3}$ | $4.49 \times 10^{-5}$ | $9.48 \times 10^{-3}$ |  |
|  | 2 | 0.1173 | $5.35 \times 10^{-5}$ | $9.10 \times 10^{-3}$ | $1.07 \times 10^{-4}$ | $9.48 \times 10^{-3}$ |  |

— $Ga_xAl_{1-x}As$ system because of its high gain, relatively broad emission spectrum and relatively advanced technology of material preparation.

In Table 2, we summarize the calculated results for waveguide structures using GaAs as the film material and $Ga_xAl_{1-x}As$ as the substrate and top-layer material. The following values are used for the various indices of refraction [16]: $n_f = 3.60$, $n_{s,t} = 3.45$, and $n_a = 1$. Since $k_z$ is limited to values between $k_0 n_f$ and $k_0 n_{s,t}$, the value of $a = \pi/k_z$ should be such that $\lambda/2n_f < a < \lambda/2n_{s,t}$. If we choose $\lambda = 8400$ A as the Bragg wavelength, then the value of a must lie between 1166.7 A and 1217.4 A for first-order Bragg diffraction. Suppose that the GaAs emission spectrum has a half width of 100 A. For Bragg scattering to take place within the half-power points of the emission spectrum, the value of a should be between 1152.8 A and 1231.9 A. Obviously, high precision is needed for the control of a in making the waveguide structure. One distinct advantage of using first-ordor Bragg diffraction is that no modes, guided or unguided, will satisfy Eq. (23).

It is expected, therefore, that a distributed laser based on first-order Bragg scattering will have low loss.

The feedback coefficient $r = \Delta\beta/\beta$ and the relative change $\Delta k_x/k_x$ in the transverse wave number are computed for a thickness variation of the top layer from $d_1 = 0.1$ μm to $d_2 = 1.0$ μm. The quantities $(\Delta n_f/n_f)_{FB}$ and $(\Delta n_f/n_f)_{RL}$ are the equivalent film-index variation needed to produce, respectively, the same amount of $\Delta\beta/\beta$ (which controls the feedback) and $\Delta k_x k_x$ (which determines the radiation loss in cases using higher order Bragg scattering). Since $k_z\Delta k_z = -k_x\Delta k_x$, $\Delta\beta/\beta = (k_x/k_z)^2(-\Delta k_x/k_x)$. Therefore, for each film thickness, the transverse mode with the highest $q$ will have the largest feedback coefficient $r$. We further note that the decreease of $\Delta k_x/k_x$ with increasing W is very moderate. This means that the maximum amount of achievable feedback for a given film thickness decreases only slightly with increasing film thickness. The quantity $\eta_s$ calculated from Eq. (21b) can be used as a measure of guide sensitivity to thickness irregularities. As we can see, the scattering loss due to surface roughness is expected to be large in a thin waveguide than in a thick waveguide.

Now we turn to the conditions for laser oscillation, and use the case with $W = 1.5$ μm and $q = 0$ as an example. The gain coefficient in GaAs can be found from the absorption coefficient $\alpha_f$ by multiplying $a_f/2$ by an appropriate population-inversion factor. Thus, for band-to-band transition, we have $$g_f = 8 \times 10^3(\hbar\omega - \epsilon_g)^{1/2} [f_c(\epsilon_1) - f_v(\epsilon_2)] \quad (65)$$

In Eq. (65), $\epsilon_1$ and $\epsilon_2$ are, respectively, the energies of conduction-band electrons and valence-band holes involved in the optical transition with $\epsilon_1 - \epsilon_2 = \hbar\omega$, and $f_c$ and $f_v$ are their respective Fermi functions. In a normal absorption experiment, we have absorption instead of gain because $f_c = 0$ and $f_v = 1$. The constant $8 \times 10^3$ [$cm^{-1}/(eV)^{1/2}$] is obtained by fitting $g_f = -\alpha_f/2$ to the optical absorption data [17]. The factor ½ accounts for the fact that $g_f$ is for field-amplitude change while $\alpha_f$ is for light-intensity change.

The energies of the electron-hole pair in a band-to-band optical transition are given by $$\epsilon_1 = \epsilon_c + m_r/m_e^* (\hbar\omega - \epsilon_g) = \epsilon_c + \epsilon_1' \quad (66a)$$

$$\epsilon_2 = \epsilon_v - m_r/m_h^* (\hbar\omega - \epsilon_g) = \epsilon_v - \epsilon_2' \quad (66b)$$

where $m_e^*$ and $m_h^*$ are the electron and hole effective mass, $m_r = m_e^* m_h^*/(m_e^* + m_h^*)$ is the reduced mass, and $\epsilon_c$ and $\epsilon_v$ are, respectively, the energy of the conduction- and valence-band edge. Suppose that the GaAs film is optically pumped to a free carrier concentration $n = p = 10^{18}$ cm$^{-3}$. Using the values [18] of $m_e^* = 0.07 \, m_0$ and $m_h^* = 0.5 \, m_0$, we find $\epsilon_{fe} - \epsilon_c = 0.052$ eV and $\epsilon_v - \epsilon_{fh} = 0.0073$ eV where $\epsilon_f$ is the Fermi energy. Consider an electron-hole pair with $\epsilon_1 - \epsilon_2 = \hbar\omega = \epsilon_g + 0.01$ eV. From Eq. (66), we have $\epsilon_1' = 0.0088$ eV and $\epsilon_2' = 0.0012$ eV which give the values of $f_c(\epsilon_1) = 0.835$ and $f_v(\epsilon_2) = 0.440$. From Eq. (65), the value of $g_f$ is found to be 315 cm$^{-1}$.

One important quantity used in calculating the laser-threshold condition is the ratio $n/\tau_R$ where $\tau_R$ is the radiative lifetime. Using the expression of Varshini [19], we find $\tau_R = 1.4 \times 10^{-9}$ sec. Thus, we need a value of $n/\tau_R = 7.2 \times 10^{26}$ cm$^{-3}$ sec$^{-1}$ to obtain a gain of $g_f = 315$ cm$^{-1}$ at $\hbar\omega = \epsilon_g + 0.01$ eV. These values can be checked against the measured values from injection lasers. The threshold current density $J_{th}$ of an injection laser is $$J_{th} = e \, nW/(\eta \, \tau_R) \quad (67)$$

where $\eta$ is the internal quantum efficiency and $W$ is the width of the active region. Using the measured values from heterojunctions at 300°K reported by Miller et al. [20], we obtain an average gain $g_f = 40$ cm$^{-1}$ for an average $n/\tau_R = 1.5 \times 10^{26}$ cm$^{-3}$ sec$^{-1}$. Since $g = J^{2.5}$, Miller's results would indicate a value of $g_f = 350$ cm$^{-1}$ at a value of $n/\tau_R = 3.7 \times 10^{26}$ cm$^{-3}$ sec$^{-1}$, in general agreement with out calculated results. Comparable numbers were also measured by Crowe and Craig [21] in ordinary junctions at 77°K. Assuming a $T^3$ temperature for $J_{th}$ and an effective $W = 20$ μ (the spread of laser beam), we estimate from their reported values that a value of $n/\tau_R = 6 \times 10^{26}$ cm$^{-3}$ sec$^{-1}$ is needed for $g_f = 188$ cm$^{-1}$.

FIG. 9 shows the calculated values of G and K for a GaAs - $Ga_xAl_{1-x}As$ distributed-laser structure corresponding to the case with $W = 1.5$ μ and $q = 0$ in Table 2. We choose a value of $g = 100$ cm$^{-1}$ for the gain, which is about twice the measured threshold value needed for heterojunction injection-lasers. Since $^2 << g^2$ for the $q = 0$ mode, both the G and K curves are essentially the same as the g and β curves. Near the Bragg condition, $\delta_{eff} < g$ and $\delta < g$; therefore Eq. (62) can be approximated by exp $(GL) = 2G/$. For $G = 100$ cm$^{-1}$ and $= 6.13$ cm$^{-1}$, a length $L = 350$ μm is needed for the laser structure. From Eq. (63), we find the two lowest values for $\delta_{eff} = \delta$ to be $\delta = \pm 35$ cm$^{-1}$. That means, the two first longitudinal modes will have wavelength about 1 A away from the Bragg wavelength.

For the feedback scheme proposed here, it appears most suitable to use optical pumping as a means to achieve population inversion. Let R be the pumping rate. Under a steady-state condition, R should be equal to the downward transition rate, that is, $R = n/(\eta \tau_R)$. Therefore, the total pumping power needed is $$P_p \, R \, h\nu_p \, WA = n /\eta\tau_R \, h\nu_p \, WA. \quad (68)$$

where W is the film thickness and A is the laser area. The pumping photon energy $h\nu_p$ should be smaller than the gap energy of $Ga_xAl_{1-x}As$. For example, luminescent $GaAs_xP_{1-x}$ diodes can be used. Letting $h\nu_p = 1.50$ eV, $W = 1.5$ μm and $A = L$, and using a value of $4 \times$ $10^{26}$ cm$^{-3}$ sec$^{-1}$ for $n/\tau_R$ and a value of 0.7 for $\eta$, we find $P_p = 24$ watts. The value of the pumping power needed indicates the possibility of using conventional light sources as the pump together with a transparent material as the top layer. Although materials such as SiO$_2$ and ZnO will have a smaller feedback coefficient $\Delta\beta/\beta$ because of their respectively low index of refraction as compared to Ga$_x$Al$_{1-x}$As, the effect of low index can be compensated by working with a higher transverse mode (higher $q$) and by reducing $d_1$ to zero. The value of $P_p = 34$ watts is calculated for the $q = 0$ mode which has the smallest $\Delta\beta/\beta$ (Table 2).

The above calculation is based on a periodic structure using the first-order Bragg diffraction. For structures using higher-order Bragg diffraction, the requirement on the accuracy to control the periodicity is much relaxed. For $m_0 = 5$, we find $a$ to be between 5764 A $< a <$ 6157 A, that is, a range of 395 A. The control of $a$ within such a range should be possible with electron-beam [22,23] and laser-holography [1] techniques. However, structures using $m < 1$ in Eq. (52) will have radiation losses. Consider the case $m_0 = 5$. From Table 1, we see that only the term $m = 3$ is involved in Eq. (43a). Further, the following approximations are appropriate: (1) $k_{xm}{}^d \approx k_{xm} \approx n_f k_0$, (2) $k_2 \approx k_1$, and (3) $k_{xm} - k_x \approx k_{xm}$. Thus, $$\sqrt{(\eta_R)_A} \approx (2n_f \Delta 13\pi n_f)(n_a n_f/n_f + 0.7 n_f) \quad (69)$$

From Table 2, $\Delta = 9.46 \times 10^{-3}$ for the case $W = 1.5$ $\mu$m and $q = 0$. Using the values of $2W \tan \theta_i^f = 44.5$ $\mu$m and $n_f = 3.6$, we obtain a loss coefficient $\sqrt{(\eta_R)_A}/2W \tan \theta_i^f$ of 0.2 cm$^{-1}$ due to radiation into air.

Next we estimate the value of $\sqrt{(\eta_R)_S}$ due to radiation into a substrate mode. Since $F_{0l'}{}^2/F_{00} F_{l'\ l'}$ is dimensionless, we can make the maximum field unity [that is, $E_E = 1$ in Eq. (9)] in the calculation. Further, since the gain $g_f$ is high in semiconductors, it is sufficient to know an upper limit rather than an accurate value for $\sqrt{(\eta_R)_S}$. In an estimate of $\sqrt{(\eta_R)_S}$, the following approximations are made: (1) $k_z \approx m_0 \pi/a \approx n_f k_0$, (2) $k_{zl} \approx n_f k_0(1 - 2m/m_0)$, (3) $F_{00} \approx W/2$, and (4) $F_{l'\ l'} \approx (W + S)/2$ where $S$ is the thickness of the substrate. To estimate $F_{0l}$, we make following observations. Since the wave functions are orthogonal, we can express $F_{0l'}$ as $$F_{0l'} = \int[G_0 - G_0')G_l' + G_0' G_l']dx = \int(G_0 - G_0')G_l' dx \quad (70)$$

The most important contribution to the change in the transverse distribution is caused by the change in the phase shift $\omega_{Ed}$ due to the thickness variation. In other words, $G_0 - G_0' \approx (G_0'/\phi_{Ed})\Delta\phi_{Ed}$. Further, the function $G_0'/\omega_{Ed}$ has appreciable values only in the film, so the integration in Eq. (70) is carried over the film thickness. Since $k_x$ is very small, $k_{xl} - k_x \approx k_{xl}$ and $k_{xl} + k_x \approx k_{xl}$. Noting that cosine functions have a maximum value of 1, we obtain after the integration an upper bound for $F_{0l}$, that is $F_{0l} < \Delta\omega_{Ed}/k_{xl}$. The value of $\Delta\omega_{Ed}$ is of the order of $\Delta k_x W$ and the value of $k_{xl}$ can be approximated by $$k_{xl} \approx \sqrt{n_s^2 k_0^2 - k_{zl}^2} \approx 2 n_f k_0 \sqrt{(m_0 - m)m/m_0^2}.$$

Thus, we find $$(\eta_R)_S \leq \left[\frac{m_0 m}{(m_0 - 2m)(m_0 - m)} \frac{\lambda^2}{W(W + S)}\right]^{1/2} \frac{\Delta k_x W}{2\pi n_f} \quad (71)$$

If we use the fifth-order Bragg scattering for the case $W = 1.5$ $\mu$m and $q = 0$ in Table 2, the following set of values is appropriate: $m_0 = 5$, $m = 1$, $\lambda = 0.84$ $\mu$m, $W = 1.5$ $\mu$m, $\Delta k_x = 3.1 \times 10^2$ cm$^{-1}$, $n_f = 3.6$, and $a = 0.5845$ $\mu$m. Using these values and $S = 0.1$ cm, we find an upper bound for the loss coefficient $\sqrt{(\eta_R)_S}/a = 0.5$ cm$^{-1}$ due to radiation into the $k_{zl} = 2.50 k_0$ substrate mode in Table 1.

From the above calculation, we see that the effective gain factor $g$ is almost unchanged even for the structure using the fifth-order Bragg scattering. However, the value of is reduced to 1.23 cm$^{-1}$ for the $q = 0$ mode. As a result, the length L of the laser structure is increased to 560 82 m and the pump power $P_p$ needed is raised to 56 watts. We should point out that the highest transverse mode for a $W = 1.5$ $\mu$m guide is $q = 3$ and it has a coupling constant $\eta = 81$ cm$^{-1}$. For $g = 100$ cm$^{-1}$ and $\eta = 81$ cm$^{-1}$, $P_1 = 128$ cm$^{-1}$. From Eqs. (62) and (68), we find $L = 104$ $\mu$m and $P_P = 2.5$ watts. In the calculation, the pump power is assumed to be concentrated in an area $A = L^2$. In a $W = 1.5$ $\mu$m waveguide with a period corresponding to $m_0 = 5$, the pumping power needed decreases from a value of 56 watts for the lowest-feedback $q = 0$ mode to a value of 2.7 watts for the highest feedback $q = 3$ mode because of reduction in A.

Another interesting class of laser materials is organic dye. An extensive survey of flash-lamp pumped laser dyes together with lasing wavelengths and appropriate solutions has been made by Warden and Gough [24]. Among the most widely used dyes are fluorescein with lasing-wavelength range centered roughly around 5400 A, rhodamine 6G around 5800 A, and rhodamine B and 6200 A. Measurements [25,26] with a He-Ne laser beam (6328 A) in rhodamine-B-doped polyurethane film have yielded a power-gain factor $2g_f$ about 13 cm$^{-1}$ at a dye concentration of $3.3 \times 10^{-2}$ mole/liter. Since intersystem crossing to the triplet states effectively reduces the gain, jucicious selection of triplet quencher [27] as additives to the dye should raise the gain and thus extend the number of dyes as possible candidates for use in flash-lamp pumped lasers. A detailed analysis [28] of the gain and threshold in organic dye lasers, taking into account the intersystem crossing, has been reported. Further, laser action has been observed in dye-doped thin films [1,29] pumped by a pulsed $N_2$ laser. In the following discussion, we show that the proposed feedback scheme using thickness variation should also work for the dye laser.

Refer to the G and K curves shown in FIG. 7 which are computed for a periodic waveguide with thickness variation from $d_1 = 0$ $\mu$m to $d_2 = 1$ $\mu$m and with the various indices chosen as $n_f = 1.560$ and $n_{s,t} = 1.514$. The gain in the film (supposed to be impregnated with dye) is taken to be $g_f = 8.0$ cm$^{-1}$ at 5800 A and to have a half-width of 100 A. The coupling constant for the structure is found to be 111 cm$^{-1}$ at 5800 A. In the wavelength range where $\delta <$ or $\sim \eta$, the G and K curves differ considerably from the g and $\beta$ curves of a corresponding uniform guide. Because of the complex nature, Eq. c61) can be satisfied only for both g and $\delta$ being nonzero. The first pair of longitudinal modes are found to situate near wavelengths where $\delta \approx \eta$. For example, at $\lambda = 5805$ A, we find $\delta = 146$ cm$^{-1}$, $\delta_{eff} = 91.2$ cm$^{-1}$, $g = 7.98$ cm$^{-1}$, and $G = 12.97$ cm$^{-1}$.

From Eq. (62), we obtain $L = 593$ $\mu$. Thus, the value of $\delta_{eff}$ is 310° while the phase angle on the right hand side of Eq. (63) is 175°. The corresponding values at $\lambda$ = 5804 A are 25° for $\delta_{eff} L$ and 167° for the right hand side. Therefore Eq. (61) is satisified at a wavelength between 5804 A and 5805 A.

Now let us consider the applicability of the proposed scheme to solid-state laser materials using the atomic levels of rare-earth elements. Recently, observation of laser action has been obtained in Yb doped YAG rods [30] and Nd doped YAG rods [31] by pumping the rods with GaAs and $GaAs_xP_{1-x}$ luminescent diodes, respectively. The spectral match of the emission from the light-emitting diodes to a chosen absorption band in YAG: Yb and YAG: Nd has reduced the threshold pump power to around a few watts. Furthermore, the emission spectrum of the rare-earth elements falls in the infrared region (with $\pi$ = 1.029 $\mu$m in YAG: Yb, $\delta$ = 1.0641 $\mu$m and $\delta$ = 1.0614 $\mu$m in YAG: Nd, and $\delta$ = 2.1 $\mu$m in YAG: Ho [32]). Since Rayleigh scattering is proportional to $\delta^{-4}$, transmission losses in glasses are comparatively low in the infrared region. A loss coefficient as low as 2.3 dB/km has been measured [33] in Suprasil at 1.06 $\mu$m. Low pumping power and low transmission loss make the rare-earth doped materials especially attractive for possible use in integrated optics.

Two important considerations concerning the rare-earth doped materials are the spontaneous emission linewidth and the gain. It has been reported by Kushida [34] that the 1.0641 $\mu$m ($R_2 \rightarrow Y_3$ transition) and 1.0614 $\mu$m ($R_1 \rightarrow Y_1$ transition) lines in YAG : Nd have a natural width of 4 $cm^{-1}$ corresponding to a wavelength bandwidth $\Delta\lambda$ = 4.5 A and shift at a rate of 0.045 A/°C with temperature around 300°K. Because of the extremely narrow linewidth, we will be faced with a situation in which the Bragg wavelength $\delta_B$ is quite a distance away from the center emission wavelength $\delta_0$ as illustrated in FIG. 10. Now the question is whether we can find a longitudinal mode within $\Delta\lambda$. The phase difference in Eq. (63) between the two operating points 1 and 2 with $\lambda_1 - \lambda_2 = \Delta\lambda$ is $$\Delta\phi = (\delta_{eff})_1 L - (\delta_{eff})_2 L \approx (\beta_1 - \beta_2) L \approx (k_1 - k_2) L \approx 2\pi n \Delta\lambda / \lambda^2 L \quad (72)$$

For $L$ = 1 mm, $n$ = 1.825 (in YAG) and $\Delta\lambda$ = 4.5 A, we find $\Delta\phi = 0.73 \times 2\pi$ rad. Therefore, if we use $L$ = 1.5 mm, we can have one longitudinal mode falling within $\Delta\lambda$. We should point out that we also can use the temperature effects ($d\lambda_0/dF$ and $dn/dT = 7.3 \times 10^{-6}$/°C in YAG [35]) to tune the wavelength such that Eq. (63) is satisfied.

Next, we estimate the threshold pump power. For first-order Bragg scattering, we need a period $a = \pi/\beta \approx 2910$ A. Control of $a$ within $\pm 300$ A is certainly possible with scanning-electron-beam lithography. As an upper limit, we take $\lambda_0 - \lambda_B$ to be 0.05 $\lambda_0$ or a value for $\delta = \delta_{eff} = 5 \times 10^3$ $cm^{-1}$. Using this value for $\delta$, $L$ = 1mm, and a value $10^2$ $cm^{-1}$ for in Eq. (62), we find that a value of 45 $cm^{-1}$ for $g$ is needed. The gain $g$ can be expressed as $g = \tau_{32} n_{32}$ where $\sigma_{32}$ is the peak cross-section for the laser transition and $n_{32}$ is the inverted population. The value [36] of $\sigma_{32}$ is reported to be around $8 \times 10^{-19}$ $cm^2$. To get $g = 45$ $cm^{-1}$, we need a value of $n_{32} = 5.6 \times 10^{19}$ $cm^{-3}$. For a concentration of 1 atomic percent, there are about $1.5 \times 10^{20}$ Nd atoms/$cm^3$. Therefore, the percentage of population inversion required by the distributed-feedback scheme for laser action is very high. In conventional YAG : Nd lasers with high-reflectivity mirrors, a value ["] of the order of $1.1 \times 10^{-2}$ for $g$ is generally sufficient at the laser threshold, corresponding to a value of $1.4 \times 10^{16}$ for $n_{32}$.

One interesting laser material is LOS : Nd (Nd activated lathanum oxysulfide $La_2O_2S$) [37]. The two closely-spaced transitions corresponding to $R_1 \rightarrow Y_1$ and $R_2 \rightarrow Y_3$ transitions in YAG : Nd are only 18 A apart and have a total linewidth about 30 A. The peak cross-section at the 1.075 $\mu$m transition is found to be $\sigma_{32} = 2.1 \times 10^{-18}$ $cm^2$. The threshold conditions are given as follows: (1) for pulsed operation, $g$ = 0.47 $cm^{-1}$ at an input energy of 1.1 J pumped by a xenon flash lamp and (2) for continuous operation, $g$ = 0.24 $cm^{-1}$ at an input power of 300 W supplied by an incandescent lamp. Corresponding numbers for YAG : Nd are: (1) for pulsed operation, $g$ = 0.099 $cm^{-1}$ with 2.75 J input and (2) for continuous operation, $g$ = 0.041 $cm^{-1}$ with 1,000 W input. The difference between the two materials is due to the stronger pump bands and the larger lasing cross-section in LOS : Nd.

From the data on pulsed operation, it appears reasonable to expect that with increased input energy, a gain around 2 $cm^{-1}$ could be achieved in LOS : Nd. We also observe that with the same amount of pumping input, the gain obtained in LOS : Nd is about 16 times larger than that in YAG : Nd. The diode-pumped YAG : Nd laser is operated at a threshold gain around $5 \times 10^{-3}$ $cm^{-1}$ (calculated from the mirror reflectivity and internal loss.). Therefore, light-emitting diodes of the same power but with emission spectrum matching the absorption band of LOS : Nd would produce in LOS : Nd a gain about $8 \times 10^{-2}$ $cm^{116\ 1}$. To get $g$ around 2 $cm^{-1}$ in LOS : Nd, we will have to use semiconductor-laser diodes operated under the pulsed condition. With a larger $\Delta\delta$ in LOS : Nd and a more accurate of the period $a$, we probably can move the operating point closer to the Bragg wavelength and thus reduce the value of $\delta$. We also can increase the value of by working with higher-order transverse modes. The values $\delta = 5 \times 10^2$ $cm^{-1}$ and = 200 $cm^{-1}$ appear quite reasonable. Use of these values in Eq. (62) gives a value $gL$ = 1.6 for the threshold condition. Therefore, we need a length $L$ = 1 cm for the distributed-laser structure.

VIII. DISCUSSION

Thus far, the concept of distributed feedback has been successfully applied only to dye lasers, for which the feedback is provided by a periodic index or gain variation in the film [1] or by a blazed grating [29] covered by a metallic film. In both approaches, gelatin film or glycerol-gelatin mixture impregnated with dye is used as the film material. By the way in which the feedback is introduced, the applicability of both methods is pretty much limited to dye lasers. Such lasers generally require another laser of high-power density, such as the $N_2$ laser, as the pump. Also laser dyes are subject to degradation and thus have a short life. On the other hand, the proposed scheme using thickness variation should be applicable to semiconductor and solid-state lasers as well as dye and liquid lasers. For example, the analysis can easily be extended to cases where the laser-active material is in the medium designated as the substrate and to cases where a thickness variation exists in the medium designated as the film. Therefore, the proposed scheme appears to be better suited for use in integrated optical systems than the existing schemes.

The main limitation of the proposed scheme is that it requires either a relatively high gain or a relatively broad emission spectrum for the active medium. The threshold condition for conventional lasers is given by $$gL = \alpha L + \ln R^{-1} \quad (73)$$

where $\alpha$ is the internal loss coefficient, $R$ is the mirror reflectivity and $L$ is the length of the active medium. A corresponding equation can be obtained for distributed lasers where $\alpha$ includes the radiation losses in addition to the free-carrier absorption in semiconductor lasers and the loss due to branching in solid-state lasers. By comparing Eq. (62) with Eq. (73), we find an equivalent reflectivity $R_e$ for distributed lasers $$R_e = /[(g + G)^2 + (\delta + \delta_{eff})^2]^{1/2} \qquad (74)$$

which can be approximated by $$(R_e)_{II} \simeq K/(K^2+g^2)^{1/2} \qquad (75a)$$

in region II of FIG. 6 where $g^2+K^2 > \delta^2$ and $G > \delta_{eff}$, and by $$(R_e)_I \simeq K/\sqrt{2}\,\delta \qquad (75b)$$

in region I of FIG. 6 where $g^2+K^2 < \delta^2$ and $G < \delta_{eff}$.

As shown in Sec. VII, the proposed scheme should be applicable to high-gain semiconductor and dye lasers. Therefore our present discussion will be concentrated on low-gain laser materials. Specifically, we are interested in those materials with a large bandwidth $\Delta\lambda$ so that the distributed laser can be made to operate near region II. For example, Nd activated lithium glass [38] and Nd: $POCl_3$ liquid [39] have a spectral width of 500 A or larger. The observed gain in these systems is around $g \simeq 0.1$ cm$^{-1}$. For $K = 50$ cm$^{-1}$, we find $(R_e)_{II} \simeq 1 - 2 \times 10^{-6}$. If we use a structure of length $L = 1$ cm, we need a value of about 5 cm$^{-1}$ for $\delta_{eff}$ to satisfy Eq. (63). This value of $\delta_{eff}$ appears possible in region II as the calculated results shown in FIG. 7 indicate.

In summary, we have shown that the proposed scheme should work for low-gain as well as high-gain laser materials under proper operating conditions. For low-gain materials, we must operate the laser in or near region II in FIG. 6. That means, we must have a relatively broad emission line so that $\lambda_B$ can be made to coincide with $\lambda_0$ in FIG. 10. Since $\delta_{eff}$ is small in region II, we need a relatively long structure (of the order of 1 cm) in order to satisfy the phase condition of Eq. (63). Insofar as Eq. (62) is concerned, we can use a high coupling constant to compensate for the low gain in a way similar to using high reflectivity mirrors in conventional lasers. For high-gain materials, our aim should be to reduce the laser dimension. To have a short $L$, we need a large $\delta_{eff}$ in Eq. (63). That means, the laser will operate in or near region I in FIG. 6. From Eq. (75b), the maximum achievable equivalent reflectivity is about 0.705. Therefore, the minimum gain required is $g = \alpha + 0.35/L$. From the above discussion, it appears that the proposed scheme will fail only in cases where the gain is low and at the same time the emission spectrum is narrow.

BRIEF DESCRIPTION OF FIGS. 12 – 20

Figure 12:
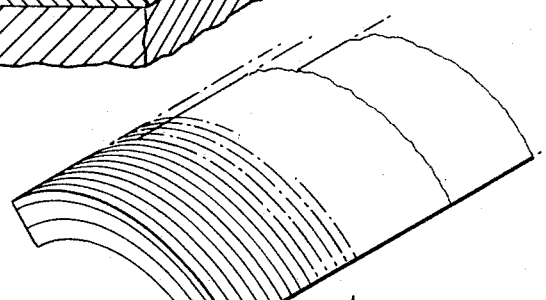

FIg. 12 is a schematic drawing of an alternate form of a laser constructed in accordance with the present invention.

Figure 13:
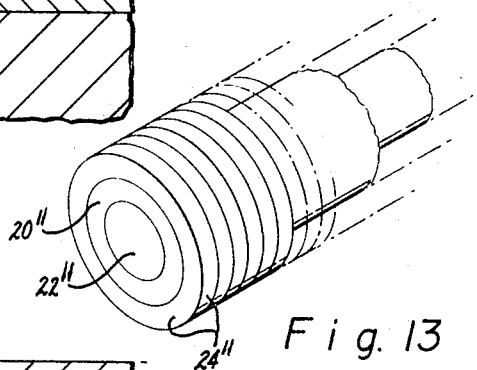

FIG. 13 is a schematic drawing of an embodiment of the present invention constructed in cylindrical form.

Figure 14:
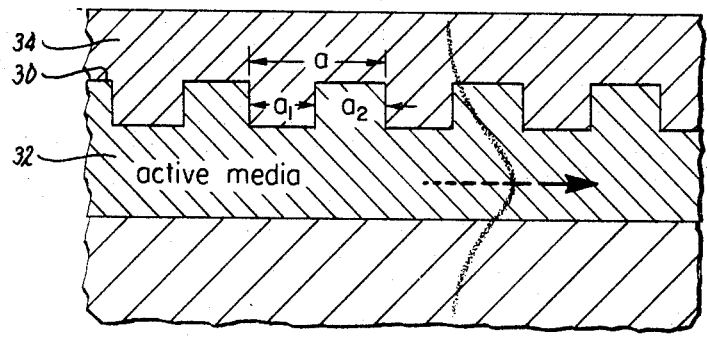
Figure 15:
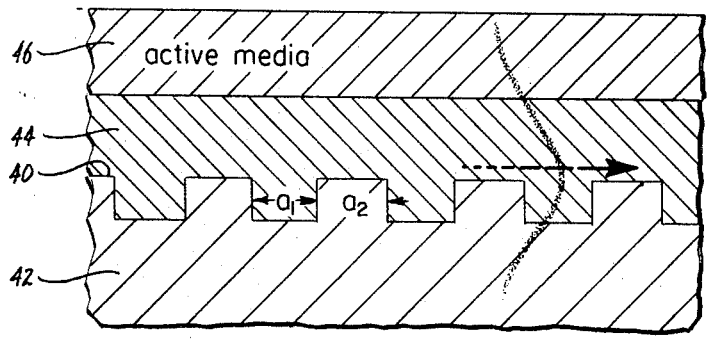

FIGS. 14 and 15 are schematic drawings of alternate configurations of lasers constructed in accordance with the present invention.

Figure 16:
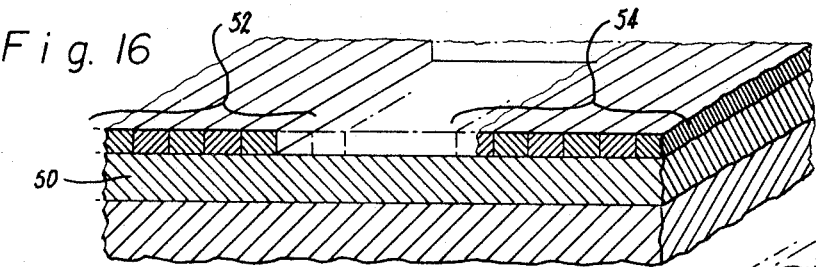

FIG. 16 is a schematic drawing showing another embodiment of a laser constructed in accordance with the present invention.

FIG. 17 is a schematic drawing showing a thin film device constructed in accordance with the present invention and configures for use as a passive device either as a stop-band filter or modulator.

FIG. 18 is a schematic drawing showing a thin film device constructed in accordance with the present invention configured for use as a pass-band filter.

FIG. 19 is a schematic drawing showing a thin film device constructed in accordance with the present invention for use as a beam deflector.

FIG. 20 is a schematic drawing showing an active or passive device constructed in accordance with the present invention in which periodic variations are azimuthally curved in a cylindrical coordinate system.

DETAILED DESCRIPTION OF THE PREFERRED EMBODIMENTS

Figure 3:
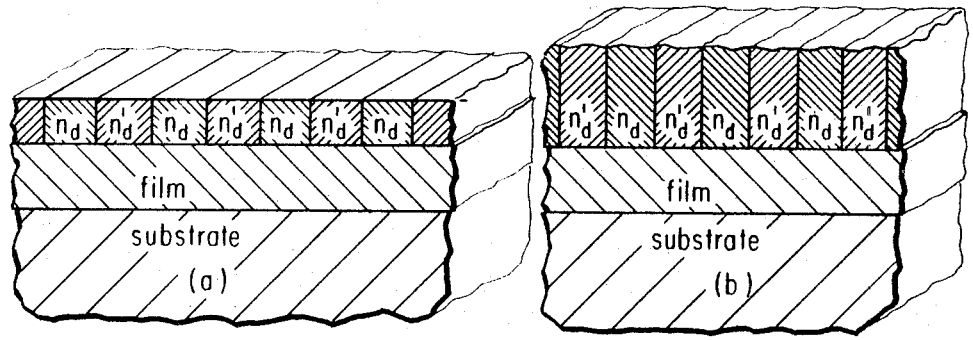
FIG. 3(a and 3) are schematic illustrations of optical waveguides with periodic variation in the refractive index of the top dielectric layer constructed in accordance with the present invention. If the thickness of the top layer is larger than the penetration depth, then the structure shown in (a) can be approximated by the structure shown in (b).

The following description relates particularly to the embodiments of FIGS. 2 and 3 as well as additional embodiments and examples of the invention contained in FIGS. 12 through 16.

In the most general sense the present invention encompasses a class of laser or light amplifiers having generalized characteristics relating to the use of a waveguide structure and the periodic variation of an optical variable in a structure associated with a boundary layer adjacent the waveguide structure. The analysis given in the preceeding discussion is expected to yield substantially similar results in a wide variety of structures in which the functional parts are interchangeable but basically related in a similar manner. By way of summary and review, the invention requires that the use of a light waveguide such that TE and TM modes of light are propagated in the waveguide and in the immediately adjacent boundary layer. In general, lasers constructed in accordance with the present invention are made with waveguide thickness preferrably less than about fifty free space wavelengths so that the waveguide acts as a waveguiding structure capable of supporting TE and TM wave propagation on which the invention operates. The waveguide is also required to have an index of refraction which is higher than the adjacent layers so that the wave will be confined in and immediately adjacent to the waveguide. In this invention, TEM wave propagation, common in ordinary lasers, is not used. Accordingly this invention is distinguished from a typical laser and from typical optical cavities in which TEM waves are propagated back and forth through a media.

The present invention requires the use of a spatially varying periodic optical parameter which varies as a function of a direction of the optical path developed in the waveguide. In order to develop coherent action the change in the optical paramter is required to have a repeat distance -$a$- which is subdivided into first and second distances $a_1$, $a_2$ where $a = a_1 + a_2$. The repeat distance is nearly equal to one half an integral number of guided wavelengths; that is to say, $a \simeq m\lambda_g/2$ as set forth at (Eq. 23a). Consistent with these constraints, many structures will be available in which the present invention can be carried out. Of course, some part of the structure will have to be arranged or adapted to provide gain for the wave of interest.

Accordingly, referring to FIG. 2 there is shown a basically planar structure using a thin waveguide film 20 deposited on a substrate 22. The waveguide film also contains an active medium to supply gain to the propagating wave. The periodic structure 24 is disposed upon this film with a periodic variation of optical property defined by the differences of depth of the dielectric boundary layer $d_1$, $d_2$. This periodic variation repeats along a direction 26 which in alignment with the direction of propagation 28 of the desired light wave in the waveguide, but each varying part intersects along a direction across the direction of propagation, usually at nearly 90° thereto. If the same structure were curved for example, about an axis in alignment with the direction of propagation of the wave (FIG. 12 where similar parts are denoted with the same numbers with the addition of the prime) a similar mode of operation would be expected. Such a curving could proceed to the limit of a circularly cylindrical tube having a core, or being coreless for that matter, the periodic structure becoming a shell of rings encircling the tube, as shown in FIG. 13 wherein similar parts are denoted by the same numbers with the addition of the double prime. Such a variation of the present invention should find application as a laser source in fiber optics. The requirement remains that the effective dimension of the medium 20' or 20'' should be less than about fifth free space lengths in order that waveguide type propagation TE and TM modes predominate as set forth herein.

Since the propagating wave which is interacting with the periodic structure extends not only within the waveguide layer itself but also somewhat beyond the waveguide layer, rearrangement of the structural parts while maintaining the interaction between the propagating wave and the periodic structure, is quite feasible, and especially useful in certain cases. For example, FIG. 14 shows a periodic variation produced at the interface 30 between a waveguiding film 32 and the boundary layer 34. Similarly, FIG. 15 shows a periodic variation introduced at the interface 40 between a substrate 42 and a waveguide film layer 44 above which an active media 46 is employed.

In these embodiments, optical gain may be secured by employing a suitable active material as a waveguide film or can be supplied by an external media as for example an additional media disposed above the waveguide layer as the media 46 of FIG. 15. Examples of material suitable for employment in the above examples will be given hereinafter.

Certain general properties characterized this invention and are most easily understood by reference to the examples of structures given. Not only must there exist a waveguide capable of capturing the lightwave and capable of propagating TE and TM waves in a given direction, but a periodic variation must influence these waves. In the present analysis, this periodic structure generally is distributed along a surface the normal to which is orthogonal to the direction of propagation of the wave in the waveguide. This is to be distinguished from a typical scattering of TEM wave in large scale structures and as the Argon gas laser wherein a scattering grating of the of the Bragg type cannot be distributed along a plane having a normal vector orthogonal to the propagating TEM wave since in such circumstances no significant interaction would take place.

In the present application, the periodic variation must be in sufficiently close proximity to the waveguide that the wave extends into the region of the periodic structure and therefore an interaction between the propagating wave and the structure can take place to produce the feedback required for laser action. As seen from the examples, however, the periodic structure for producing this feedback can be located either at the waveguide boundary, at the boundary of an adjacent layer or at the interface between the adjacent layer and the waveguide boundary. But it will be noted that it is removed or separate from the waveguide itself even if portions thereof are made of the same material as in FIGS. 14 & 15. Any of the several layers of the laser of this invention can contain active media, since the distribution of the propagating wave in the adjacent layer in many cases is adequate to provide sufficient gain.

Referring again to FIG. 2, one can alternatively understand the operation of certain structural variations shown herein by consideration of that structure in certain limiting cases. For example, if $d_1$ is allowed to approach zero and the index of refraction of the dielectric layer permitted to approach that of the waveguide, with air or vacuum as a top layer $n_1$ approximately that of free space, the analysis will still be applicable. The development of such a structure results in the example shown in FIG. 14 in which layer 34 is air or vacuum. Referring again to FIG. 2, if $d_1$ is allowed to approach $d_2$, both being finite, and the periodic variation in the dielectric possesses indices of refraction $n_1$, $n_2$ different from the waveguide layer, one has the example shown in FIG. 3. Where $d_1 \neq d_2$ is used as the periodic variation, ($n_1 = n_2$) the smaller of the two of these distances must be capable of interaction with a portion of the propagating wave. Typically this requires that $d_2$ if it is smaller, to be of the order of magnitude of the penetration distance of the wave into the boundary layer. This distance is typically less than one guided wavelength $\lambda_g$.

Accordingly, many variations in the particular location of the periodic variation as well as variations in particular indices of refraction of the layer with respect to the waveguide will suggest themselves to those skilled in this art and should be understood to be included within the scope of the present invention.

Means are provided for pumping the laser of the present invention and can consist of any of the known pumping schemes suitable for the particular active media being used. The following examples for the media disclosed herein are not to be taken in a limiting sense but to exemplify the carrying out of the invention for the disclosed materials. For example, for GaAs, incandescent lamp, flash lamp, or an electroluminescent diode pump sources are suitable. For dye media, flash lamps are usually satisfactory; and for rare earth doped glass, either flash lamp or electroluminescent diodes are suitable.

Typically the area in which the pumping power is required is fairly small, and the previous discussion shows the lasers in an integrated optical system are practical in the range of about sub-millimeter to centimeter size. Since this is small compared to the size of usual pump sources available, some form of light concentration to enhance efficiency is not only practical but desirable. Examples vary depending upon the physical characteristics of the pump means and include condensing optics, reflectors and the like. In this way the power density from low power pump sources are raised to useful power densities within the laser active media.

Where first order scattering is used, the predicted radiation loss due to grating effect is negligible. For higher order modes, the radiation loss is not negligible and is taken into account so that the pump power required will have to be increased to make up for loss. It should be mentioned that in practical operation, the distance -a- differs from theoretical first order scattering by about one part in one thousand.

In order to make practical structure which satisfies the conditions set forth herein some type of tuneability is desired. It will be noted that the direction of propagation of the wave in the waveguide can occur over a wide range even though confined in the plane of the waveguide. Accordingly, possible propagating waves made a continuously variable angle $\zeta$ with respect to the direction defined exactly by the elements of the periodic variation. See particularly FIG. 2 where one possible direction 28 of the propagating wave is shown relative to two vectors 26, 30 defining the periodic structure. Within an otherwise proper bandwidth, there exists a tolerance value for -a- which is a function of the angle $\zeta$ between the propagating wave and the orientation of the periodic structure. This angle $\zeta$ can apparently be quite large, although at about 45° the angle would have become so large that operation would not be expected. But for small angles, the effective -a- for a match to the bandwidth of $\lambda_g/2$ should be taken as having a tolerance over which operation will still be possible. This tolerance is determinend by the bandwidth of the spontaneous emission line of the active member, and is directly proportional to bandwidth of $\lambda_g$ of the opontaneous emission line.

Examples of materials for structural systems in which the present invention can be carried out are as follows:

FIGS. 2 and 3, waveguide layer 20 GaAs $n = 3.60$ substrate layer 22 $Ga_xAl_{1-x}As$ $n= 3.45$ boundary layer 24 $Ga_yAl_{1-y}As$ $n = 3.35$ Examples of suitable boundary dielectric materials modified to produce $n_1$, $n_2$ include various photoresists such as polymethylmethacrylate Kodak P 4942 and acted upon by an electron beam to produce bands $a_1$, $a_2$ as in FIG. 3 in which $n_1$ is not equal to $n_2$. One such treatment changes the index of refraction permanently. Another photoresists include Kodak MICRONEG or Shipley A 1350 which are responsive to light exposure in bands to produce a similar result when $n_1 \neq n_2$. Such photoresists can be impregnated with the active media such as a dye where they both are incorporated in the same layer.

In addition to tuning by the angle which the propagating wave travels with respect to its intersection with the elements of the period structure, which increases as the cotangent of that angle, other types of fine tuning could be used. Temperature variations will effect $a_1$, $a_2$ and $n_1$, $n_2$ and therefore controlling of the temperature can be used to fine tune the structure in certain cases. Electro-optic and magneto-optic effects can also be applied to change the physical and electrical properties of one of the layers. In general, these effects will serve more as fine tuning of the laser to maximize its gain. In some instances it will be possible to amplitude modulate the output by shifting the operation from a maximum on the gain curve to a much lower value. Since this is essentially a frequency of operation shift, the same type of operation can be used as in frequency shift modulator where the gain of the system has more than one maximum, i.e., more than one laser line, within the band width of tuneability.

Referring now to FIG. 16, there is shown a modified form of the present invention in which the means for forming the periodic variation are divided into two groups 52, 54 positioned at spaced apart locations on the waveguide 50. In this way, gross reflection between the two groups can take place in a manner somewhat analogous to reflections in the more conventional laser systems. Each of the groups serves to act like an end mirror with respect to waves propagating in the waveguide.

In the above discussion, it is shown that a periodic structure can be used to provide distributed feedback in thin film lasers and to provide selective amplification in thin film amplifiers. Lasers and amplifiers are active devices in which there is a net gain. It will now be shown that a periodic structure can also be used to perform certain passive device functions, such as filtering deflecting, focusing and modulating a laser beam.

It is well known from the energy-band theory of solids that there are stop bands in the energy versus $k$ diagram. Similarly, stop bands (FIG. 5) also exist in the $\omega$ versus $k$ diagram of a periodic waveguide. A laser beam will be reflected back by a periodic structure if the wavelength of the beam falls within the stop band of the structure. Therefore, a single section 58 of a periodic waveguide as shown in FIG. 17 can be used as a stop-band filter. The band width of the filter is determined by the two values of the physical parameter of the waveguide which varies periodically in space, e.g. $d_1$ and $d_2$ in FIG. 2. It is also possible to arrange periodic waveguides 60, 62 in tandem as shown in FIG. 18, each having a different stop band sufficiently separated to leave a frequency gap between stop bands, as shown.

It should be pointed out that the interaction of a laser beam with a periodic structure is not limited to the colinear case where the direction of the laser beam propagation (designated as the $z$ direction) coincides with the direction of periodicity of the waveguide (designated as the $z'$ direction). Referring to FIG. 19, there is shown a section 66 of periodic structure constructed in accordance with the present invention. Let $a$ be the period of the waveguide structure and $\theta$ be the angle between $z$ and $z'$ directions.

A laser beam of guided wavelength $\lambda_g =2a \sin \theta$ is satisfied. Therefore, a periodic waveguide can be used as a guided laser beam deflector if two side arm nonperiodic waveguides 68, 70 oriented at angles $\pm \theta$ with respect to the periodic waveguide 66 are provided for delivering the incident and receiving the deflected beams.

Another important passive device for guided laser beams is a modulator. Note that the guided wavelength $\lambda_g$ is a function of the optical index of refraction which can be varied by an applied field through the electro-optic or magneto-optic effect. In the case of oblique incidence, as shown in FIG. 19 it is obvious that the amplitude of the deflected beam will be influenced by an applied field as the Bragg condition changes. FIG. 19 shows the use of acoustic transducers for applying a microwave acoustic signal for changing the Bragg condition slightly so that the reflective condition shifts between satisfied and unsatisfied states. In other words, the deflected beam amplitude is changed because the incident beam 64 tuned into and out of the Bragg condition and the output beam 66 will be digitally modulated between on and off conditions accordingly. For the collinear case, as in FIG. 17, the guided wavelength is shifted with respect to the center of the stop band as the applied field is changed as by applying an electric field across the devide with electrodes 70, 71 converted to a voltage source 72 through modulator control 74, therefore, the transmission of a laser beam is modulated by the applied field as the guided wavelength of the beam is moved in and out of a stop band.

The periodic structures discussed so far have periodic variations all aligned straight and perpendicular to the direction z of propagation of the guided laser beam as shown in FIG. 2. Reflected waves generated in this type of periodic structure will have the same beam width as the incident beam. Therefore, waveguide structures with straight and parallel periodic variation behave like plane-parallel mirrors. FIG. 20 shows schematically a different type of waveguide structures where periodic variations in the physical parameter of the waveguide appear in the configurations made of concentric circles 80, i.e., in cylindrical geometry. Note that only reflected waves propagating in the radial direction of the concentric circle will experience a regular periodic variation of the physical parameter of the waveguide, and thus be able to satisfy the Bragg condition. Such curved periodic waveguide structures behave like cylindrical mirrors to provide focusing action on the laser beam analogous to that provided by spherical mirrors in conventional lasers and optical resonators. In other words, the reflected laser beam will have a beam width much smaller than thte incident beam. By using spaced pairs of reflecting structures such as shown in FIG. 20 in the manner of FIG. 16, this film configurations of the various focusing combinations (confacal, etc.) of conventional optical resonators can be realized.

Lasers constructed in accordance with the present invention may be made to operate on a wide range of the light spectrum including the visible, infrared and ultraviolet. Accordingly, use of the words light, and optical, in this application should be taken in a broad sense so as to encompass the light spectrum so defined. As used herein the expression, we, should be taken in the editorial rather than the personal sense.

To those skilled in the art to which the present invention relates, many modifications and adaptations thereof will occur. Accordingly, the present disclosure and analysis should be taken as illustrative of the invention and not as a limitation thereon.

I claim:

1. A laser comprising an optical waveguide for propagating TE and TM waves of light at a predetermined frequency and guided wavelength therein, said waveguide having a predetermined optical index of refraction and being made of a material transparent to light at said predetermined frequency, means defining at least one boundary layer adjacent to said waveguide such that the propagating TE and TM waves for light at said predetermined frequency extend both within said waveguide and into said boundary layer, said boundary layer having one or more indices of refraction at least a portion of which is less than the index or refraction of said waveguide, one of said waveguide or boundary layer being a laser active material which exhibits gain with respect to light at said predetermined frequency, means associated with said boundary layer or said boundary layer and said waveguide for forming a periodic variation of the index of refraction thereof throughout a region optically coupled to said propagating wave, said periodic variation being arranged for causing a spatial variation of said index of refraction between two values which repeat in a regular pattern and have a periodicity of -a- selected from one of the half-integral multiples of the guided wavelength of said light in said waveguide so that said spatial variation produces periodic reflections which progressively interact constructively to modify said propagating wave.

2. A laser as in claim 1 further including a second boundary layer in which said waveguide is disposed as a thin film, and, in which said first boundary layer is also in the form of a thin film.

3. Laser as in claim 1 in which the thickness dimension of said boundary layer varies between the two values, one of which has a depth less than the penetration depth of said propagating wave.

4. A laser as in claim 1 in which said waveguide is circular in cross section and in which said boundary layer is in the form of a circular shell surrounding said waveguide.

5. A laser as in claim 1 in which said means for forming a periodic variation is divided into two groups of periodic variations positioned at spaced apart locations on said waveguide so that gross reflection between said groups takes place.

6. A laser as in claim 1 in which said one of said boundary layer and waveguide interfaces contain periodic spatial variation of depth.

7. A laser as in claim 2 in which said second boundary layer and said waveguide interface contain a spatial periodic variation and further in which said waveguide is constructed of an active medium exhibiting gain to said light at said predetermined frequency.

8. A laser as in claim 1 in which the periodicity of said variation is arranged to substantially satisfy a scattering condition for one order thereof.

9. A laser as in claim 1 in which said periodic variation consists of the changing of an optical parameter in the same direction as the optical path within said waveguide the change in said optical parameter having a repeat distance -a- subdivided into a first distance -$a_1$- and a second distance -$a_2$- where $a = a_1 + a_2$ and further wherein -a- is equal to one-half an integral number of guided wavelength ($a = m\lambda_g/2$).

10. A laser as in claim 1 in which a portion thickness dimension of the boundary layer and waveguide define an interface containing said periodic variation.

11. A laser as in claim 3 in which the side of said boundary layer away from said waveguide contains said periodic variations of thickness dimension and in which one of said values of thickness is of the order of magnitude of penetration distance of said propagating wave into said boundary layer.

12. A laser as in claim 11 in which said one thickness dimension is less than a guided wavelength of said light in said waveguide.

13. A laser as in claim 1 in which said waveguide thickness is less than about fifty free space wavelengths of said propagation lightwave.

14. A laser as in claim 1 wherein said active media in GaAs and disposed as a thin film on a substrate of $Ga_xAl_{1-x}As$.

15. A laser as in claim 14 wherein said active media is incorporated in said waveguide layer.

16. A laser as in claim 15 in which said boundary layer is made of $Ga_yAl_{1-y}As$.

17. In an integrated optical system having means forming a light path therein, a laser disposed in said light path and comprising an optical waveguide oriented to propagate light of a predetermined wavelength in a particular direction such that said light propagates TE or TM wave in said waveguide, said waveguide having a predetermined optical index of refraction and being made of a material transparent to light at said predetermined frequency, means defining at least one boundary layer adjacent to said waveguide such that the propagating TE and TM waves for light at said predetermined frequency extend both within said waveguide and into said boundary layer, said boundary layer having one or more indices of refraction at least a portion of which is less than the index of refraction of said waveguide, one of said waveguide or boundary layer being a laser active material which exhibits gain with respect to light at said predetermined frequency, means associated with said boundary layer, or said boundary layer and said waveguide for forming a periodic variation of the index of refraction thereof throughout a region optically coupled to said propagating wave, said periodic variation being arranged for causing a spatial variation of said index of refraction being two values which repeat in a regular pattern and have a periodicity of -a- selected from one of the half-integral multiples of the guided wavelength of said light in said waveguide so that said spatial variation produces periodic reflections which progressively interact constructively to modify said propagating wave, means for supplying gain to a light wave propagating through said waveguide.

18. An integrated optical circuit as in claim 17 in which said means for supplying gain is incorporated in said waveguide.

19. An integrated optical system as in claim 17 wherein said means for supplying said gain is incorporated in said boundary layer.

20. An integrated optical system as in claim 17 further including a substrate on which said waveguide is disposed in intimate contact and in which said means for supplying gain is incorporated in said substrate.

21. A thin film optical device comprising an optical waveguide defining a guided wavelength for a propagating wave of light at a predetermined frequency, said waveguide having a predetermined optical index of refraction and being made of a material transparent to light of said predetermined frequency, means defining at least one boundary layer adjacent to said waveguide and in such proximity that the propagating wave for light at said predetermined frequency extends both within said waveguide and into said boundary layer, said boundary layer having one or more indices of refraction at least a portion of which is less than the index of refraction of said waveguide, means associated with said boundary layer of said boundary layer and said waveguide for forming a periodic variation of the index of refraction thereof throughout a region optically coupled to said propagating wave, said periodic variation being arranged for causing a spatial variation of said index of refraction between two values which repeat in a regular pattern and have a periodicity of -a- selected from one of the half-integral multiples of the guided wavelength of said light in said waveguide so that said spatial variation produces periodic reflections which progressively interact constructively to modify said propagating wave.

22. An optical device as in claim 21 in which said regular pattern is rectilinear giving rise to collinear reflections in said waveguide.

23. An optical device as in claim 21 in which said regular pattern has a concentric form in a cylindrical coordinate system.

24. A thin film optical device as in claim 21 further including means for introducing and receiving light waves from said device collinearly with respect to the reflection angle of said periodic variations.

25. A thin film optical device as in claim 21 further including means for introducing and means for receiving light waves from said device at the Bragg reflection angle thereof.

26. A thin film pass band filter comprising a first optical waveguide defining a guided wavelength for a propagating wave of light at a predetermined frequency, said first waveguide having a predetermined optical index of refraction and being made of a material transparent to light of said predetermined frequency, first means defining at least one boundary layer adjacent to said waveguide and in such proximity that the propagating wave for light at said predetermined frequency extends both within said waveguide and into said boundary layer, said boundary layer having one or more indices of refraction at least a portion of which is less than the index of refraction of said waveguide, first means associated with said boundary layer or said boundary layer and said waveguide for forming a periodic variation of the index of refraction thereof throughout a region optically coupled to said propagating wave, said periodic variation being arranged for causing a spatial variation of said index of refraction between two values which repeat in a regular pattern and have a periodicity of -a- selected from one of the half-integral multiples of the guided wavelength of said light in said waveguide so that said spatial variation produces periodic reflections which progressively interact constructively to modify said propagating wave, a second optical waveguide defining a guided wavelength for a propagating wave of light at a predetermined frequency said second waveguide having a predetermined optical index of refraction and being made of a material transparent to light of said predetermined frequency, second means defining at least a second boundary layer adjacent to said waveguide and in such proximity that the propagating wave for light at said predetermined frequency extends both within said waveguide and into said boundary layer, said second boundary layer having one or more indices of refraction at least a portion of which is less than the index of refraction of said waveguide, second means associated with said boundary layer or said boundary layer and said waveguide for forming a periodic variation of the index of refraction thereof throughout a region optically coupled to said propagating wave, said periodic variation being arranged for causing a spatial variation of said index of refraction between two values which repeat in a regular pattern and have a periodicity of -b- selected from one of the half-integral multiples of the guided wavelength of said light in said waveguide so that said spatial variation produces periodic reflections which progressively interact constructively to modify said propagating wave, said first and scond waveguides being arranged in tandem and constructed with stop bands at frequencies sufficiently distant to define a pass band between them.

27. A thin film modulator for light of a predetermined frequency comprising an optical waveguide defining a guided wavelength for a propagating wave of light at a predetermined frequency, said waveguide having a predetermined optical index of refraction and being made of a material transparent to light of said predetermined frequency, means defining at least one boundary layer adjacent to said waveguide and in such proximity that the propagating wave for light at said predetermined frequency extends both within said waveguide and into said boundary layer, said boundary layer having one or more indices of refraction at least a portion of which is less than the index of refraction of said waveguide, means associated wth said boundary layer or said boundary layer and said waveguide for forming a periodic variation of the index of refraction thereof throughout a region optically coupled to said propagating wave, said periodic variation being arranged for causing a spatial variation of said index of refraction between two values which repeat in a regular pattern and have a periodicity of -a- selected from one of the half-integral multiples of the guided wavelength of said light in said waveguide so that said spatial variation produces periodic reflections which progressively interact constructively to modify said propagating wave, said periodic variations and the thickness of said layers being constructed and arranged to define thereby a stop band, one edge of which is in the neighborhood of said predetermined frequency, and means for varying the index of refraction at least one of said waveguide and boundary layers to shift said stop band across said frequency.

28. An optical device as in claim 27 in which said index of refraction varying means comprises a conductive means disposed on each side of said waveguide and boundary layer, means of supplying a voltage to said conductive means, means for shifting said voltage between on and off states.

29. A laser comprising an optical waveguide for propagating TE and TM waves of light at a predetermined frequency and guided wavelength therein, said waveguide having a predetermined optical index of refraction and being made of a material transparent to light at said predetermined frequency, means defining at least one boundary layer adjacent to said waveguide such that the propagating TE and TM waves for light at said predetermined frequency extend both within said waveguiide and into said boundary layer, said boundary layer having one or more indices of refraction at least a portion of which is less than the index of refraction of said waveguide, one of said waveguide or boundary layer being a laser active material which exhibits gain with respect to light at said predetermined frequency, means associated with said boundary layer, said waveguide, or said boundary layer and said waveguide for forming a periodic variation of the thickness thereof throughout a region optically coupled to said propagating wave, said periodic variation being arranged for causing a spatial variation of said thickness between two values which repeat in a regular pattern and have a periodicity of -a- selected from one of the half-integral multiples of the guided wavelength of said light in said waveguide so that said spatial variation produces periodic reflections which progressively interact constructively to modify said propagating wave.

30. In an integrated optical system having means forming a light path therein, a layer disposed in said light path and comprising an optical waveguide oriented to propagate light of a predetermined wavelength in a particular direction such that said light propagates TE or TM wave in said waveguide, said waveguide having a predetermined optical index of refraction and being made of a material transparent to light at said predetermined frequency, means defining at least one boundary layer adjacent to said waveguide such that the propagating TE and TM waves for light at said predetermined frequency extend both within said waveguide and into said boundary layer, said boundary layer having one or more indices of refraction at least a portion of which is less than the index of refraction of said waveguide, one of said waveguide or boundary layer being a laser active material which exhibits gain with respect to light at said predetermined frequency, means associated with said boundary layer, said waveguide, or said boundary layer and said waveguide for forming a periodic variation of the thickness thereof throughout a region optically coupled to said propagating wave, said periodic variation being arranged for causing a spatial variation of said thickness between two values which repeat in a regular pattern and have a periodicity of -a- selected from one or the half-integral multiples of the guided wavelength of said light in said waveguide so that said spatial variation produces periodic reflections which progressively interact constructively to modify said propagating wave, means for supplying gain to a light wave propagating through said waveguide.

* * * * *